(12) United States Patent
Yoo et al.

(10) Patent No.: US 11,659,248 B1
(45) Date of Patent: May 23, 2023

(54) METHOD, SERVER AND COMPUTER-READABLE MEDIUM FOR GENERATING INTERACTIVE CONTENT

(71) Applicant: GENESIS LAB, INC., Seoul (KR)

(72) Inventors: Dae Hun Yoo, Seoul (KR); Young Bok Lee, Seoul (KR)

(73) Assignee: GENESIS LAB, INC., Seoul (KR)

( * ) Notice: Subject to any disclaimer, the term of this patent is extended or adjusted under 35 U.S.C. 154(b) by 0 days.

(21) Appl. No.: 17/746,705

(22) Filed: May 17, 2022

(30) Foreign Application Priority Data

Mar. 8, 2022 (KR) .......................... 10-2022-0029504

(51) Int. Cl.
*H04N 21/47* (2011.01)

(52) U.S. Cl.
CPC .................................... *H04N 21/47* (2013.01)

(58) Field of Classification Search
CPC ......... H04N 21/4532; H04N 21/25891; H04N 21/8456; H04N 21/25883; H04N 21/26258; H04N 21/2668; H04N 21/4184; H04N 21/4331; H04N 21/436; H04N 21/43615; H04N 21/4367; H04N 21/44004; H04N 21/44218
See application file for complete search history.

(56) References Cited

U.S. PATENT DOCUMENTS

2014/0136469 A1\* 5/2014 Lamb ...................... G11B 27/11
706/59

\* cited by examiner

*Primary Examiner* — Samira Monshi
(74) *Attorney, Agent, or Firm* — Studebaker & Brackett PC

(57) ABSTRACT

The present invention relates to a method, a server and a computer-readable medium for generating an interactive content, and more particularly, to a method, a server and a computer-readable medium for generating an interactive content, in which node generation information for each of a plurality of nodes included in the interactive content is received from a user terminal of a user who wants to generate the interactive content, and a plurality of nodes including an interactive video in which a specific interactive object utters text information included in the received node generation information, and node connection information for connection with one or more other nodes corresponding to a next node according to condition information included in the node generation information are generated, so that the interactive content including the nodes is generated.

6 Claims, 21 Drawing Sheets

<S> Hello? </S>
:
<Anger> Why did you lie !! </Anger>
:

C　　　　　　B

METHOD, SERVER AND COMPUTER-READABLE MEDIUM FOR GENERATING INTERACTIVE CONTENT

CROSS-REFERENCE TO RELATED APPLICATION

This application claims priority to Korean Patent Application No. 10-2022-0029504 filed Mar. 8, 2022 with the Korean Intellectual Property Office, the contents of which are incorporated herein by reference.

BACKGROUND OF THE INVENTION

1. Field of the Invention

The present invention relates to a method, a server and a computer-readable medium for generating an interactive content, and more particularly, to a method, a server and a computer-readable medium for generating an interactive content, in which node generation information for each of a plurality of nodes included in the interactive content is received from a user terminal of a user who wants to generate the interactive content, and a plurality of nodes including an interactive video in which a specific interactive object utters text information included in the received node generation information, and node connection information for connection with one or more other nodes corresponding to a next node according to condition information included in the node generation information are generated, so that the interactive content including the nodes is generated.

2. Description of the Related Art

Recently, as social demands for non-face-to-face services are increased, various technologies for realizing the non-face-to-face services have been developed. In particular, the technologies, which provides content such as questions to a user and provides a next content determined according to various actions taken by the user with respect to the content, have been developed in order to provide non-face-to-face services suitable for the user.

Specifically, in the related art, a technology related to interactive content that provides the user with a video of a specific object uttering to the user, recognizes various reactions (such as answers, facial expressions, and gestures) that the user expresses to the video, and provides a next content video corresponding to the reactions, has been spotlighted.

However, in order to produce an interactive content in the related art, it is very difficult for a general user who does not have video production skill and coding knowledge to directly produce the interactive content, because professional coding knowledge is required to directly produce each video included in the interactive content and set a connection relationship between videos according to interactions of users.

Accordingly, as described above, there are needs for developing a platform for enabling even general users to easily generate interactive contents and produce separate interactive contents.

SUMMARY OF THE INVENTION

The present invention relates to a method, a server and a computer-readable medium for generating an interactive content, and more particularly, provides a method, a server and a computer-readable medium for generating an interactive content, in which node generation information for each of a plurality of nodes included in the interactive content is received from a user terminal of a user who wants to generate the interactive content, and a plurality of nodes including an interactive video in which a specific interactive object utters text information included in the received node generation information, and node connection information for connection with one or more other nodes corresponding to a next node according to condition information included in the node generation information are generated, so that the interactive content including the nodes is generated.

In order to solve the above problem, one embodiment of the present invention provides a method for generating an interactive content performed in a service server communicating with one or more user terminals and including one or more processors and one or more memories, in which one or more interactive objects are stored in the service server, the method including: a content generation interface providing step of providing a content generation interface to a user terminal, and receiving node generation information, on the content generation interface from a user of the user terminal, that includes object selection information including selection of a specific interactive object among the one or more interactive objects for each of one or more nodes, and text information, and further includes condition information for proceeding from the node to one or more other nodes according to an input of the user; and a node generating step of, based on the node generation information, generating a node including node connection information connected to one or more other nodes corresponding to a next node according to an interactive video in which the specific interactive object utters corresponding text information and corresponding condition information or preset basic condition information when the corresponding condition information is not inputted, wherein the interactive content includes a plurality of nodes, and each node is connected to one or more other nodes by corresponding the node connection information.

According to one embodiment of the present invention, the node connection information may include: one or more condition values for each of one or more interactions in which the user may respond to a corresponding node; and branch values for one or more other nodes transited within the interactive content when the one or more condition values are satisfied.

According to one embodiment of the present invention, the content generation interface may display one or more node setting layers that receive node generation information for each of one or more nodes according to an input of the user, and the node setting layer may include a video confirmation element for displaying a playback layer that generates and plays the interactive video in which a specific interactive object included in the node generation information utters text information included in the node generation information, according to a selection input of the user.

According to one embodiment of the present invention, in the node generation step, when a face image is additionally received from a user of the user terminal on the content generation interface in the content generation interface providing step, a face of the selected specific interactive object may be replaced with the face image, and an interactive video in which the interactive object replaced with the face image utters text information may be generated.

According to one embodiment of the present invention, the node generation information received in the content generation interface providing step may further include emotion meta information assigned to each of one or more utterance units included in the text information, and the interactive video generated in the node generation step may include one or more non-verbal elements corresponding to the emotional meta information assigned to one or more utterance units when the interactive object utters the one or more utterance units.

In order to solve the above problem, one embodiment of the present invention provides a service server a service server including at least one processor and at least one memory, communicating with one or more user terminals to perform a method for generating an interactive content, in which one or more interactive objects are stored in the service server, the service server including: a content generation interface providing step of providing a content generation interface to a user terminal, and receiving node generation information, on the content generation interface from a user of the user terminal, that includes object selection information including selection of a specific interactive object among the one or more interactive objects for each of one or more nodes and text information, and further includes condition information for proceeding from the node to one or more other nodes according to an input of the user; and a node generating step of, based on the node generation information, generating a node including node connection information connected to one or more other nodes corresponding to a next node according to an interactive video in which the specific interactive object utters corresponding text information and corresponding condition information or preset basic condition information when the corresponding condition information is not inputted, wherein the interactive content includes a plurality of nodes, and each node is connected to one or more other nodes by corresponding node connection information.

In order to solve the above problem, one embodiment of the present invention provides a computer-readable medium for implementing a method for generating an interactive content performed by a service server communicating with one or more user terminals and including at least one processor and at least one memory, in which one or more interactive objects are stored in the service server, the computer-readable medium stores instructions for enabling the service server to perform the following steps, and the method for generating the interactive content includes: a content generation interface providing step of providing a content generation interface to a user terminal, and receiving node generation information, on the content generation interface from a user of the user terminal, that includes object selection information including selection of a specific interactive object among the one or more interactive objects for each of one or more nodes and text information, and further includes condition information for proceeding from the node to one or more other nodes according to an input of the user; and a node generating step, based on the node generation information, of generating a node including node connection information connected to one or more other nodes corresponding to a next node according to an interactive video in which the specific interactive object utters corresponding text information and corresponding condition information or preset basic condition information when the corresponding condition information is not inputted, wherein the interactive content includes a plurality of nodes, and each node is connected to one or more other nodes by corresponding node connection information.

According to one embodiment of the present invention, a content generation interface to a user terminal may be provided, and a user who uses the user terminal may generate an interactive content by inputting node generation information for each of a plurality of nodes included in the interactive content to be generated on the content generation interface, so that even a user without professional knowledge can easily generate an interactive content.

According to one embodiment of the present invention, the user in the content generation interface may input object selection information and text information for a specific interactive object stored in the service server, and accordingly, the service server may generate an interactive video in which the specific interactive object utters the text information, so that the user can generate an interactive content without producing a separate video.

According to one embodiment of the present invention, the user may input node connection information using various non-verbal elements, such as voice recognition, face recognition, and motion recognition, as condition values through the content generation interface, and accordingly, various types of interactions of a user using an interactive content produced by the inputting user may be recognized, so that users' interest in the interactive content can be increased.

According to one embodiment of the present invention, when the user selects a video confirmation element included in the node setting layer, the interaction video may be generated according to the node generation information inputted by the user and may be provided through the playback layer, so that the user can check a result according to the node generation information inputted by the user in advance.

According to one embodiment of the present invention, when a face image is additionally received from the user terminal in the node generation step, the user may apply the face image to a specific interactive object selected by the user, and the interactive video in which the specific interactive object utters the text information may be generated, so that the interactive video can be easily generated using only an image.

According to one embodiment of the present invention, the node generation information may further include emotion meta information, the interactive video generated according to the node generation information, when one or more utterance units included in text information are uttered according to the emotion meta information, may utter the one or more utterance units by using one or more non-verbal elements corresponding to the emotion meta information, so that an interactive video added with one or more non-verbal elements can be generated.

DETAILED DESCRIPTION OF THE INVENTION

Figure 1:
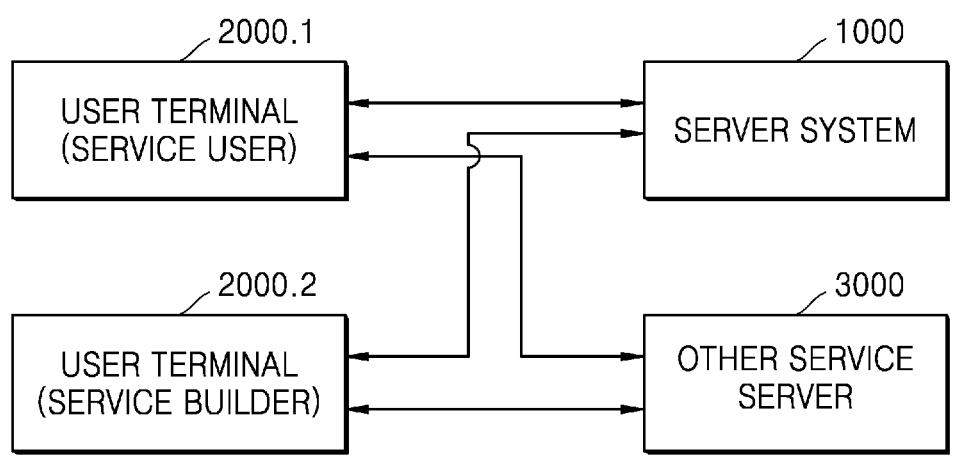
FIG. 1 schematically shows components that perform a method for providing a video interaction platform according to one embodiment of the present invention.

Hereinafter, various embodiments and/or aspects will be described with reference to the drawings. In the following description, numerous specific details are set forth in order to provide a thorough understanding of one or more aspects for the purpose of explanation. However, it will also be appreciated by a person having ordinary skill in the art that such aspect(s) may be carried out without the specific details. The following description and accompanying drawings will be set forth in detail for specific illustrative aspects among one or more aspects. However, the aspects are merely illustrative, some of various ways among principles of the various aspects may be employed, and the descriptions set forth herein are intended to include all the various aspects and equivalents thereof.

In addition, various aspects and features will be presented by a system that may include a plurality of devices, components and/or modules or the like. It will also be understood and appreciated that various systems may include additional devices, components and/or modules or the like, and/or may not include all the devices, components, modules or the like recited with reference to the drawings.

The term "embodiment", "example", "aspect", "exemplification", or the like as used herein may not be construed in that an aspect or design set forth herein is preferable or advantageous than other aspects or designs. The terms 'unit', 'component', 'module', 'system', 'interface' or the like used in the following generally refer to a computer-related entity, and may refer to, for example, hardware, software, or a combination of hardware and software.

In addition, the terms "include" and/or "comprise" specify the presence of the corresponding feature and/or component, but do not preclude the possibility of the presence or addition of one or more other features, components or combinations thereof.

In addition, the terms including an ordinal number such as first and second may be used to describe various components, however, the components are not limited by the terms. The terms are used only for the purpose of distinguishing one component from another component. For example, the first component may be referred to as the second component without departing from the scope of the present invention, and similarly, the second component may also be referred to as the first component. The term "and/or" includes any one of a plurality of related listed items or a combination thereof.

In addition, in embodiments of the present invention, unless defined otherwise, all terms used herein including technical or scientific terms have the same meaning as commonly understood by those having ordinary skill in the art. Terms such as those defined in generally used dictionaries will be interpreted to have the meaning consistent with the meaning in the context of the related art, and will not be interpreted as an ideal or excessively formal meaning unless expressly defined in the embodiment of the present invention.

1. Method for Providing Video Interaction Platform

Prior to describing in detail the method for generating interactive content of the present invention, a mechanism for consuming a video tree (interactive content) by a user consuming the video tree (interactive content) through a video interaction platform, and a method for providing the video tree (interactive content) in the video interaction platform will be described first.

Meanwhile, the video tree described in the present invention is not simply understood as a one-way form that proceeds only from an upper node to a lower node. Like the commonly known video graph, it may be preferably understood as a form connected in various directions, such as a lower node connected to an upper node or nodes connected to each other at the same level.

FIG. 1 schematically shows components that perform a method for providing a video interaction platform according to one embodiment of the present invention.

As shown in FIG. 1, the method for providing the video interaction platform may be performed by communicating with the user terminal in a server system 1000. Specifically, a service user may, through a user terminal 2000.1, request other service to be provided from the server system 1000 or a video tree for performing an interaction, and the server system 1000 may provide a video tree corresponding to the other service or a video tree corresponding to the request to the user terminal 2000.1, so that the service user may perform an interact with the video tree.

The user provided with the video tree (a user using a service based on the video tree) performs an interaction with a first video of the video tree, and the server system 1000 provides a next video according to the interaction inputted by the user with respect to the first video. Accordingly, the user performs the interaction with the videos of the video tree provided sequentially, so as to be, finally, provided with other services according to one or more interactions of the user. In other words, the video tree may contain a plurality of videos, and each of the videos may have a specific location. Accordingly, the user initially using the video tree may be located at the first video of the video tree, and the user may perform an interaction with the first video, so that the user may be moved to a video corresponding to a different location according to the interaction. Accordingly, the user's location in the video tree may be moved when the user performs one or more interactions, and the other service corresponding to the specific video may be provided when the user is located in a specific video among one or more final videos in the video tree, or a specific user interaction in one or more specific videos is inputted.

Meanwhile, the video interaction platform performed by the server system 1000 of the present invention may directly provide other services, however, as shown in FIG. 1, the other services may be provided to the user through a separate other service server 3000. Accordingly, when the user is located in a specific video among the final videos in the video tree, or the user inputs a specific interaction in the specific video, the server system 1000 may provide other service connection information to the user, and the user may be provided with the other service by communicating with the separate other service server 3000 through the other service connection information. Meanwhile, the other service server 3000 may provide one or more other services to the user, and FIG. 1 illustrates that the server system 1000 performs communication with one other service server 3000. However, in another embodiment of the present invention, when a plurality of other services connected through the server system 1000 are provided, the server system 1000 may communicate with a plurality of other service servers 3000. In addition, in another embodiment of the present invention, the other service server 3000 may not directly provide a service to the user terminal 2000, and the other service server 3000 may provide the other service to the server system 1000, and the server system 1000 may serve to provide the provided other service to the user terminal 2000. Specifically, the other service may be provided to the user terminal 2000 through the other service providing unit 1700 included in the server system 1000.

In addition, the method for providing the video interaction platform performed by the server system 1000 may provide the stored video tree to the user and provide other services according to the user's interaction, and may provide an interface for enabling the corresponding user to directly generate a video tree at a request of the user (the user who wants to generate or produce the video tree (interactive content)). Specifically, when a user terminal 2000.2 of the user (the user who wants to generate or produce the video tree (interactive content)) requests the interface for generating a video tree from the server system 1000, the server system 1000 may provide the interface to the user terminal 2000.2, and the user (the user who wants to generate or produce the video tree (interactive content)) may configure the video tree through the interface. The video tree configured in the above manner may be used by other users (users using the video tree-based service).

According to one embodiment of the present invention, each user terminal 2000.1 and 2000.2 may communicate with the server system 1000 through a separate application or a separate web page in order to be provided with the video interaction platform through the server system 1000. Accordingly, each of the user terminals 2000.1 and 2000.2 may be installed therein with the separate application, or access the separate web page through the web browser installed in each user terminal 2000.1 and 2000.2. In addition, the user may generate an account for accessing the server system 1000 through the application or the web page, and the user terminals 2000.1 and 2000.2 may access the server system 1000 through account information inputted from the user to receive a service of the video interaction platform.

Figure 2:
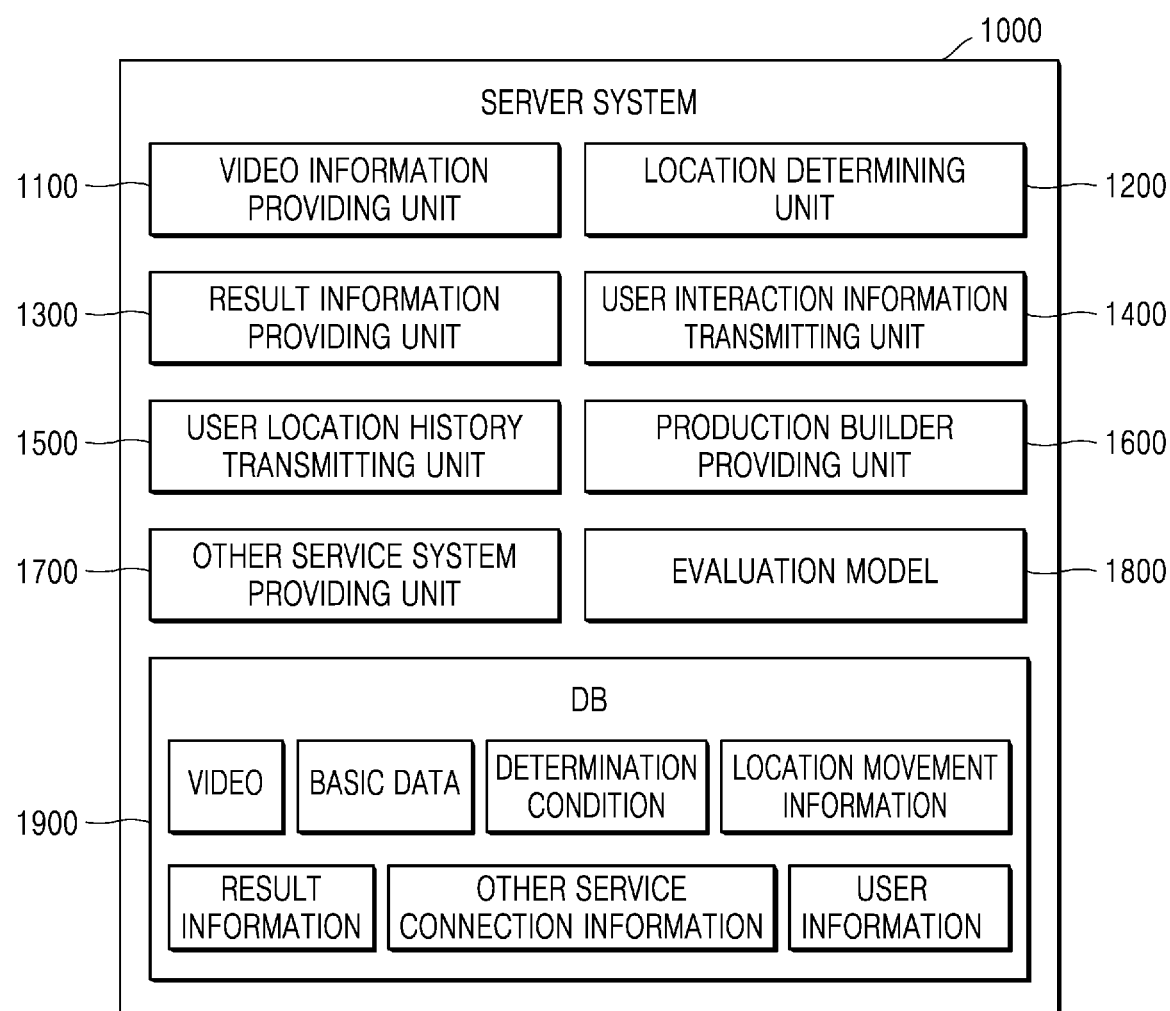
FIG. 2 schematically shows internal components of a server system according to one embodiment of the present invention.

FIG. 2 schematically shows internal components of the server system 1000 according to one embodiment of the present invention.

As shown in FIG. 2, the server system 1000 that performs the method for providing the video interaction platform includes a video information providing unit 1100, a location determining unit 1200, a result information providing unit 1300, a user interaction information transmitting unit 1400, a user location history transmitting unit 1500, a production builder providing unit 1600, the other service system providing unit 1700, a machine-learned evaluation model 1800, and a DB 1900.

the server system 1000 may store video information including a plurality of videos for the video tree or basic data for generating the videos, location condition information including a determination condition for determining an interaction of the user with each video and location movement information for location movement according to the determination condition, and result information corresponding to the location of the user in the video tree or the interaction of the user with the video.

Specifically, the video information, the location condition information, and the result information may be stored in the DB 1900. The video information includes a plurality of videos included in the video tree or basic data for generating the videos. According to one embodiment of the present invention, when the video tree is provided to the user, a specific video corresponding to a location among the videos may be provided to the user according to the user's location in the video tree. According to another embodiment of the present invention, when the video tree is provided to the user, the server system 1000 may automatically generate a video according to the user's location in the video tree, and the generated video may be provided to the user. The basic data may correspond to a factor for automatically generating a video in the server system 1000. Specifically, the basic data may correspond to data for automatically generating a video corresponding to the user's input, through a separate machine-learned model like a conventional AI human according to a user's input in the server system 1000.

The location condition information includes a determination condition and location movement information. The determination condition may refer to information for determining an interaction inputted by the user with respect to each video of the video tree provided to the user. More specifically, the determination condition may include one or more detailed determination conditions. For example, when the user inputs an interaction with respect to the video provided to the user, the server system 1000 may, according to the determination condition for the video, determine whether the interaction is a positive response or a negative response to the corresponding video. At this point, the positive response and the negative response may correspond to each detailed determination condition included in the determination conditions. The location movement information corresponds to information for moving the user's location according to the interaction determined according to the determination condition for each video. For example, when the interaction inputted by the user with respect to a specific video is determined as a response that satisfies a preset condition (determination condition), the server system 1000 may move the user's location to another video or to a location for allowing the interaction to be re-inputted, according to the location movement information for the specific video.

The result information corresponds to information provided to the user when the user inputs an interaction in the video tree and is located in a specific video, or the user inputs a specific interaction in a specific video. Specifically, the result information includes information about an analysis result on a video finally provided to the user according to one or more interactions inputted by the user in the video tree, or one or more interactions inputted by the user. The result information may further include other service connection information for providing the user with the other service separate from the interaction in the video tree, according to one or more interactions inputted by the user in the video tree.

The other service connection information corresponds to information for linking other services provided when the user inputs an interaction in the video tree and is located in a specific video, or the user inputs a specific interaction in a specific video. Specifically, the video tree may include one or more other service connection information, and each of the other service connection information may match with one or more specific videos of the video tree or a specific interaction in one or more specific videos. Accordingly, when the user is located in any one specific video among one or more specific videos in the video tree, or inputs a specific interaction with respect to any one specific video among one or more specific videos, matched other service connection information may be provided to the user, and the user may communicate, through the other service connection information, with the other service server 3000 or the other service providing unit 1700 corresponding to the internal configuration included in the server system 1000, thereby receiving other services according to the interaction. In addition, as shown in FIG. 1, the DB 1900 may store user information for each user registered in the server system 1000.

Meanwhile, as shown in FIG. 1, the DB 1900 individually store elements constituting the video tree (such as video information, location condition information, and other service connection information). However, according to another embodiment of the present invention, the DB 1900 may individually store a plurality of video trees, and each stored video tree may include video information, location condition information, and result information corresponding to the video tree.

The server system 1000, as described above, may perform the method for providing the video interaction platform, through the video information, the location condition information and the result information stored in the DB 1900.

Specifically, the video information providing unit 1100 may provide a video tree corresponding to the user's request by performing the video information providing step S10. Preferably, the video information providing unit 1100 may provide a video corresponding to the user's current location from the video tree corresponding to the user's request. Accordingly, the user may input an interaction for the corresponding video.

The location determining unit 1200 may perform the location determining step S11 to determine a next location of the user according to the interaction inputted by the user with respect to the video provided to the user. Specifically, the location determining unit 1200 determines the interaction inputted by the user with respect to the video according to the determination condition corresponding to the video to determine a next location of the user based on the determined interaction and location movement information corresponding to the video. The next location determined by the location determining unit 1200 may correspond to a video different from the video provided to the user by the video information providing unit 1100, or may correspond to a location in which the user is allowed to input an interaction again with respect to the video provided by the video information providing unit 1100.

The result information providing unit 1300 performs a result information providing step S13 to provide the user with result information for allowing the user to access other services when the location of the user in the video tree or the interaction inputted for the video provided to the user corresponds to a preset condition. Specifically, one or more conditions may be preset in the video tree, and the one or more conditions may correspond to one or more pieces of other service connection information, respectively. Accordingly, when the user is located in a video corresponding to a specific condition in the video tree, or inputs an interaction corresponding to the specific condition, the result information providing unit 1300 may provide the user with result information including other service connection information corresponding to the specific condition. Accordingly, the user may communicate with the other service server 3000 providing other services, or the other service providing unit 1700 included in the server system 1000 through the provided other service connection information.

The user interaction information transmitting unit 1400 may perform the user interaction information transmitting step to provide user interaction information including one or more interactions inputted by the user with respect to the video tree to the other service server 3000 providing other services or the other service providing unit 1700 included in the server system 1000. Accordingly, the other service server 3000 providing other services or the other service providing unit 1700 may receive the user interaction information to provide other services suitable for the user.

The user location history transmitting unit 1500 may perform the user location history transmitting step to provide one or more location information in which the user has been located with respect to the video tree to the other service server 3000 providing other services or the other service providing unit 1700 included in the server system 1000. Accordingly, like the above-described user interaction information transmitting unit 1400, the other service server 3000 providing other services or the other service providing unit 1700 may receive the one or more location information to provide other services suitable for the user.

As shown in FIG. 1, the server system 1000 may include both of the user interaction information transmitting unit 1400 and the user location history transmitting unit 1500 to provide, to the other service server 3000 or the other service providing unit 1700 of the server system 1000 that provide other services, user interaction information and one or more location information in which the user has been located in the video tree. However, According to another embodiment of the present invention, the server system 1000 may include only one of the user interaction information transmitting unit 1400 and the user location history transmitting unit 1500 to provide only one piece of information of the user interaction information and the one or more location information to the other service server 3000 or the other service providing unit 1700.

The production builder providing unit 1600 may perform a production builder providing step to provide the user terminal of the corresponding user with a video tree generation interface 1610 for enabling the user to directly generate a video tree at a request of the user. the user, through the video tree generation interface 1610, may generate a video tree is generated by inputting video information, location condition information, and other service connection information corresponding to the elements constituting the above-described video tree, and the information inputted through the video tree generation interface 1610 may be stored in the DB 1900 of the server system 1000.

The other service providing unit 1700 may provide other services to the user according to the other service connection information included in the result information provided to the user through the result information providing unit 1300. Specifically, the user, according to the one or more interactions inputted in the video tree, may be provided with other service connection information for providing other services suitable for the user, and the other service providing unit 1700 may provide the other service corresponding to the other service connection information to the user. Meanwhile, the other service may correspond to a service linked according to the one or more interactions inputted by the user in the video tree provided to the user, or the one or more locations in which the user has been located in the video tree. For example, the video tree may correspond to determining a type of mental illness of the user. When the type of mental illness possessed by the user is determined through the video tree, the other service may correspond to a solution for treating the determined mental illness. In addition, the other service providing unit 1700 may provide a plurality of other services related to the video tree. According to another embodiment of the present invention, a plurality of other service providing unit 1700 corresponding to the number of the other services related to the video tree may be individually included in the server system 1000.

The evaluation model 1800 may receive the interaction inputted by the user with respect to the video included in the video tree to derive inference information about the interaction. Specifically, the evaluation model 1800 may be a machine-learned evaluation model 1800 and may include a feature extraction model receiving an inputted interaction to extract a feature value, and a feature inference model that derives inference information according to the feature value derived from the feature extraction model. Accordingly, according to the present invention, the evaluation model 1800 may be used so as to even infer a patterned interaction in addition to the interaction by the user selecting a specific option among preset options.

As shown in FIG. 2, the server system 1000 of the present invention may be composed of a single server and all of the internal components of the server system 1000 may be included in the single server. However, in another embodiment of the present invention, the server system 1000 may be configured to include of a plurality of servers, the servers may include one or more internal components among the internal components of the above-described server system 1000, and the servers may communicate with each other.

Figure 3:
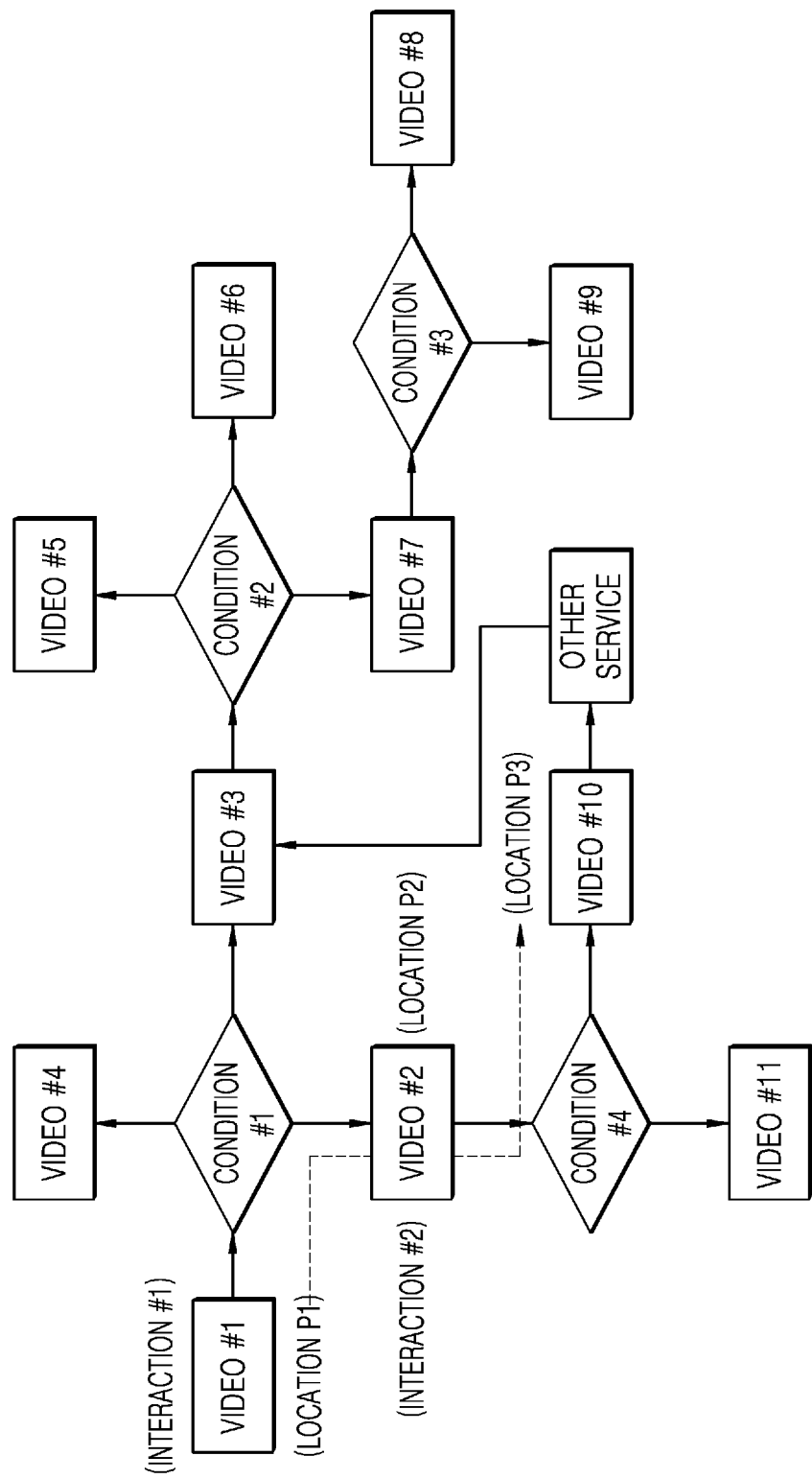
FIG. 3 schematically shows a video tree according to one embodiment of the present invention.

FIG. 3 schematically shows a video tree according to one embodiment of the present invention.

As shown in FIG. 3, the video tree may be composed of a plurality of videos. Specifically, the video tree may be connected to a plurality of videos corresponding to the video tree stored in the DB 1900, or the video tree may be configured such that the video tree includes only the initial video, and the next video is automatically linked from the initial video based on an interaction inputted by the user with respect to the initial video, location condition information for the initial video, and basic data corresponding to the video tree.

As shown in FIG. 3, each of the videos included in the video tree may include a unique location value. When the user interacts with the video tree, a video (video #1) corresponding to an initial location (location P1) of the user in the video tree is provided to the user, and when the user inputs an interaction (interaction #1) with respect to the video (video #1), the location of the user in the video tree may be moved.

Specifically, the video tree may include conditions for determining the interaction inputted by the user for each video, and moving the location to another video according to the determined interaction. The condition may correspond to the above-described location condition information. More specifically, when the user inputs an interaction with respect to the video corresponding to a current location of the user in the video tree provided by the video information providing unit 1100, the location determining unit 1200 may determine the interaction according to the determination condition for the video, and to determine a next location of the user according to the determined interaction and the location movement information for the video.

For example, as shown in FIG. 3, when the current location of the user in the video tree is video #1, and the user inputs interaction #1 with respect to the video #1, the location determining unit 1200 may determine the user's next location as video #2 (location P2), based on the location condition information corresponding to interaction #1 and condition #1 inputted by the user.

Accordingly, the process of providing the user with the video corresponding to the user's current location in the video tree, and determining the next location according to the user's interaction in the video may be repeated sequentially until the location of the user or the interaction inputted by the user satisfies the preset condition.

Specifically, as in video #4, video #5, video #6, video #8, video #9, video #10, and video #11 shown in FIG. 3, when the user's location is moved to the location corresponding to a video to which location condition information is not connected in the video tree, the result information providing unit 1300 may determine that the user's location satisfies the preset condition, thereby providing the user with result information including other service connection information corresponding to the location. In addition, even when the user inputs a specific interaction for the video to which the location condition information is linked, the result information providing unit 1300 may determine that the specific interaction inputted by the user satisfies the preset condition, thereby providing the user with the result information including other service connection information corresponding to the video and the specific interaction inputted in the video.

For example, as shown in FIG. 3, when the user's location is moved to video #10 (location P3) based on interaction #2 and condition #4 inputted by the user for video #2 (location P2), the result information providing unit 1300 may determine that the user's location satisfies the preset condition, thereby providing the user with the result information including other service connection information corresponding to video #10. As in the above, the user may be provided with the other service corresponding to video #10 by accessing the other service server 3000 providing the other service corresponding to video #10 or the other service providing unit 1700 included in the server system 1000 through the provided other service connection information.

Meanwhile, the result information corresponding to the location of the user in the video tree or the interaction of the user with the video may include other service connection information for providing other services to the user, and the specific video included in the video tree may be connected with service result information obtained when the user performs the other service.

Specifically, according to one embodiment of the present invention, when the other service is provided through other service connection information included in the result information provided to the user, the service of the video interaction platform may be terminated. However, according to another embodiment of the present invention, the user may be provided with the other service and the service result information derived from the other service server 3000 or the other service providing unit 1700 may be connected to a specific video included in the video tree, so that the user may perform the interaction again from a location corresponding to the specific video.

For example, when the user performs one or more interactions on the video tree determining mental illness, and when the user has received other services for the treatment of depression, and service result information for the other services is configured to perform the determination of depression again, the user may perform an interaction at a location corresponding to a specific video (video #3 in FIG. 3) that enables the determination of depression in the corresponding video tree again.

Accordingly, according to the present invention, the service result information provided by other services may be linked back to a specific location in the video tree, so that various types of services, such as providing feedback on other services, can be provided.

Meanwhile, the present invention has described that the video tree includes a plurality of videos. However, according to another embodiment of the present invention, a tree in the form of a plurality of texts or a tree in the form of a plurality of audios may be used, and the user may input an interaction for text corresponding to a current location in the tree, or an interaction for audio corresponding to the current location.

Figure 4:
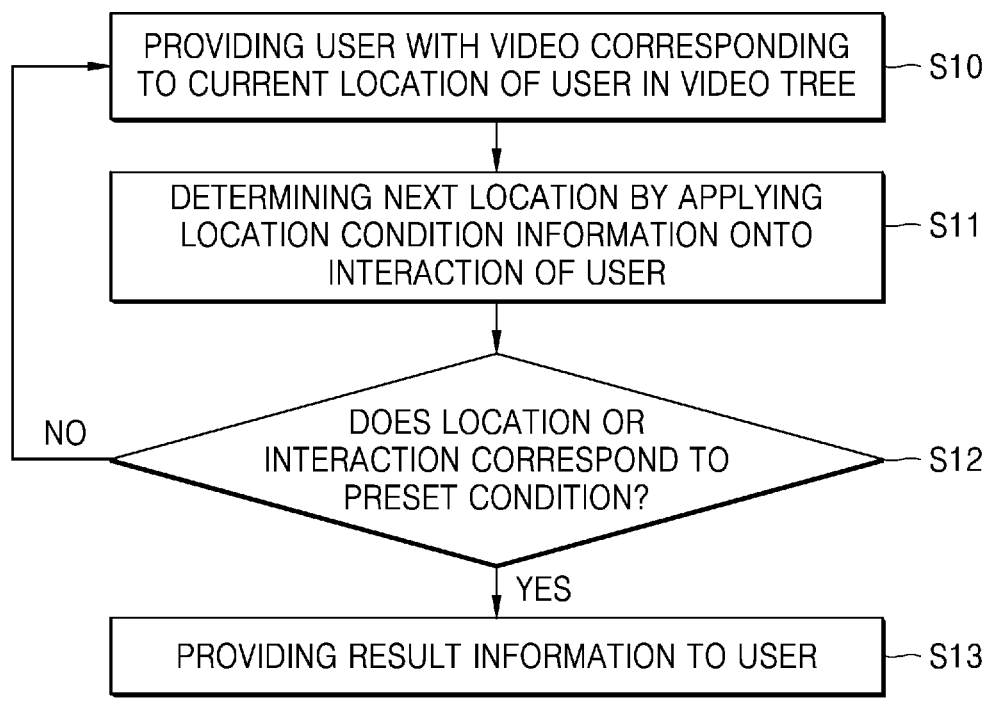
FIG. 4 schematically shows detailed steps of the method for providing the video interaction platform according to one embodiment of the present invention.

FIG. 4 schematically shows detailed steps of the method for providing the video interaction platform according to one embodiment of the present invention.

As shown in FIG. 4, the method for providing the video interaction platform may include: a video information providing step S10 of providing a video corresponding to a current location of a user in a video tree to the user; a location determining step S11 of determining a next location of the user by applying location condition information corresponding to the current location of the user in the video tree with respect to an interaction of the user for the video provided through the video information providing step S10; and a result information providing step S13 of providing result information to the user when the location of the user or the interaction of the user for one or more videos corresponds to a preset condition.

Specifically, in the video information providing step S10, a video corresponding to a current location of the user in the video tree requested by the user is provided to the user. Specifically, when a video is provided for the first time from the video tree requested by the user, an initial location in the video tree may be set as the current location of the user, and the video corresponding to the initial location may be provided to the user. According to another embodiment of the present invention, in the video information providing step S10, an interface for playing the video corresponding to the current location may be provided in addition to simply providing the video corresponding to the current location to the user, and the user may play the video through the interface, and input an interaction for the corresponding video.

The user provided with the video corresponding to the current location through the video information providing step S10 may input the interaction for the video. In the location determining step S11, a next location of the user in the video tree may be determined according to the interaction inputted by the user with respect to the video. Specifically, in the location determining step S11, the next location of the user may be determined based on the interaction inputted by the user with respect to the video and the location condition information corresponding to the video. More specifically, in the location determining step S11, the interaction may be determined according to the interaction for the video and the determination condition included in the location condition information for the video, and the next location of the user may be determined based on the determined interaction and the location movement information included in the location condition information for the video.

Meanwhile, the video information providing step S10 and the location determining step S11 may be repeated sequentially in order to move the location of the user in the video tree. Specifically, it is determined whether the user's next location determined through the location determining step S11 satisfies a preset condition, or whether the interaction inputted by the user with respect to the video corresponding to the location satisfies the preset condition (S12).

In step S12, when the user's next location or the specific interaction inputted by the user with respect to the video corresponding to the current location does not satisfy the preset condition, the video information providing step S10 and the location determining step S11 may be repeated sequentially.

Meanwhile, in step S12 when the user's next location or the specific interaction inputted by the user with respect to the video corresponding to the current location satisfies the preset condition, the result information providing step S13 may be performed.

Specifically, in the result information providing step S13, result information corresponding to the video of the user's next location, or result information corresponding to the specific interaction inputted by the user with respect to the video of the current location may be provided to the user. Meanwhile, the result information may include one or more interactions inputted by the user on the video tree, or an analysis result of a final video according to the video of the user's next location, or the one or more interactions inputted by the user. The result information may further include other service connection information for providing other services to the user.

The other service connection information may correspond to information for allowing the user to access the other service server 3000 providing other services related to the video for the user's next location or other services associated with a specific interaction inputted by the user with respect to the video of the current location, or the other service providing unit 1700 included in the server system 1000. For example, the other service connection information may correspond to link information for accessing the other service server 3000 or the other service providing unit 1700.

Figure 5A:
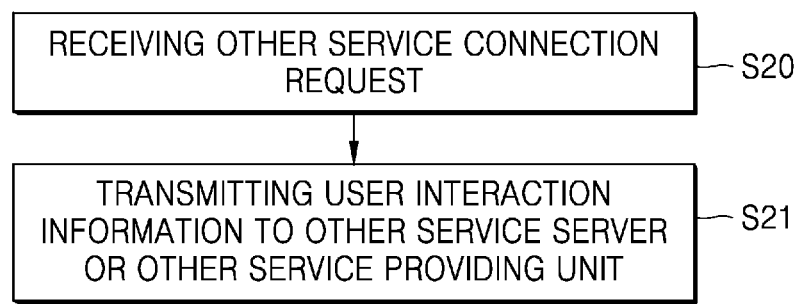
FIGS. 5A and 5B schematically show a user interaction information transmission step and a user location history transmission step according to one embodiment of the present invention.
Figure 5B:
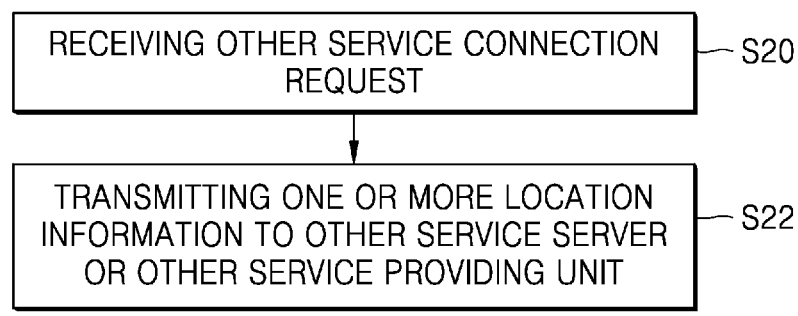

FIGS. 5A and 5B schematically show a user interaction information transmission step and a user location history transmission step according to one embodiment of the present invention.

FIG. 5A schematically shows a user interaction information transmitting step according to one embodiment of the present invention. FIG. 5B schematically shows a user location history transmitting step according to one embodiment of the present invention.

As shown in FIG. 5A, the result information corresponding to the location of the user in the video tree or the interaction of the user with the video includes other service connection information for providing other services to the user, and the method for providing the video interaction platform may further include: a user interaction information transmitting step, when the user requests a connection to the other service through the other service connection information provided through the result information providing step S13, of transmitting user interaction information including an interaction for each of one or more videos performed by the user in the video tree to an internal configuration of the other service server 3000 performing the other service or the server system 1000 performing the other service.

Specifically, when the user accesses the other service server 3000 providing other services or the other service providing unit 1700 and requests the other service S20 through the other service connection information included in the result information provided through the result information providing step S13, the user interaction information transmitting step includes: deriving user interaction information including one or more interactions inputted by the user with respect to one or more videos included in the video tree, and transmitting the user interaction information to the other service server 3000 or the other service providing unit 1700 from which the user has requested other services (S21).

According to the above configuration, the other service server 3000 providing other services or the other service providing unit 1700, upon providing the other services requested by the user to the user, may use the user interaction information including the interactions inputted by the user, so that user-customized services can be provided.

Meanwhile, as shown in FIG. 5B, the result information corresponding to the location of the user in the video tree or the user's interaction for the video includes other service connection information for providing other services to the user, and the method for providing the video interaction platform may further include: a user location history transmitting step, when the user requests a connection to the other service through the other service connection information provided through the result information providing step S13, of transmitting one or more location information, in which the user has been located in the video tree, to the internal configuration of the other service server 3000 performing the other service or the server system 1000 performing the other service.

Specifically, when the user accesses the other service server providing other services or the other service providing unit to request the other service S20 by using the other service connection information included in the result information provided through the result information providing step S13, the user location history transmitting step includes: transmitting one or more location information of the user having been located in the video tree to the other service server 3000 or the other service providing unit 1700 from which the user has requested other services (S22).

In another embodiment of the present invention, the one or more location information may even include information about one or more videos on which the users have been located, in addition to the location information of one or more users in the video tree.

According to the above configuration, the other service server 3000 providing other services or the other service providing unit 1700, upon providing the other services requested by the user to the user, may use the one or more location information for the user having been located in the video tree, so that user-customized services can be provided.

According to one embodiment of the present invention, only one piece of information among the user interaction information and the one or more location information in which the user has been located may be provided to the other service server 3000 or the other service providing unit 1700, by performing only one step of the user interaction information transmitting step and the user location history transmitting step. According to another embodiment of the present invention, both of the user interaction information and the one or more location information in which the user has been located may be provided to the other service server 3000 or the other service providing unit 1700, by performing both of the user interaction information transmitting step and the user location history transmitting step.

Figure 6:
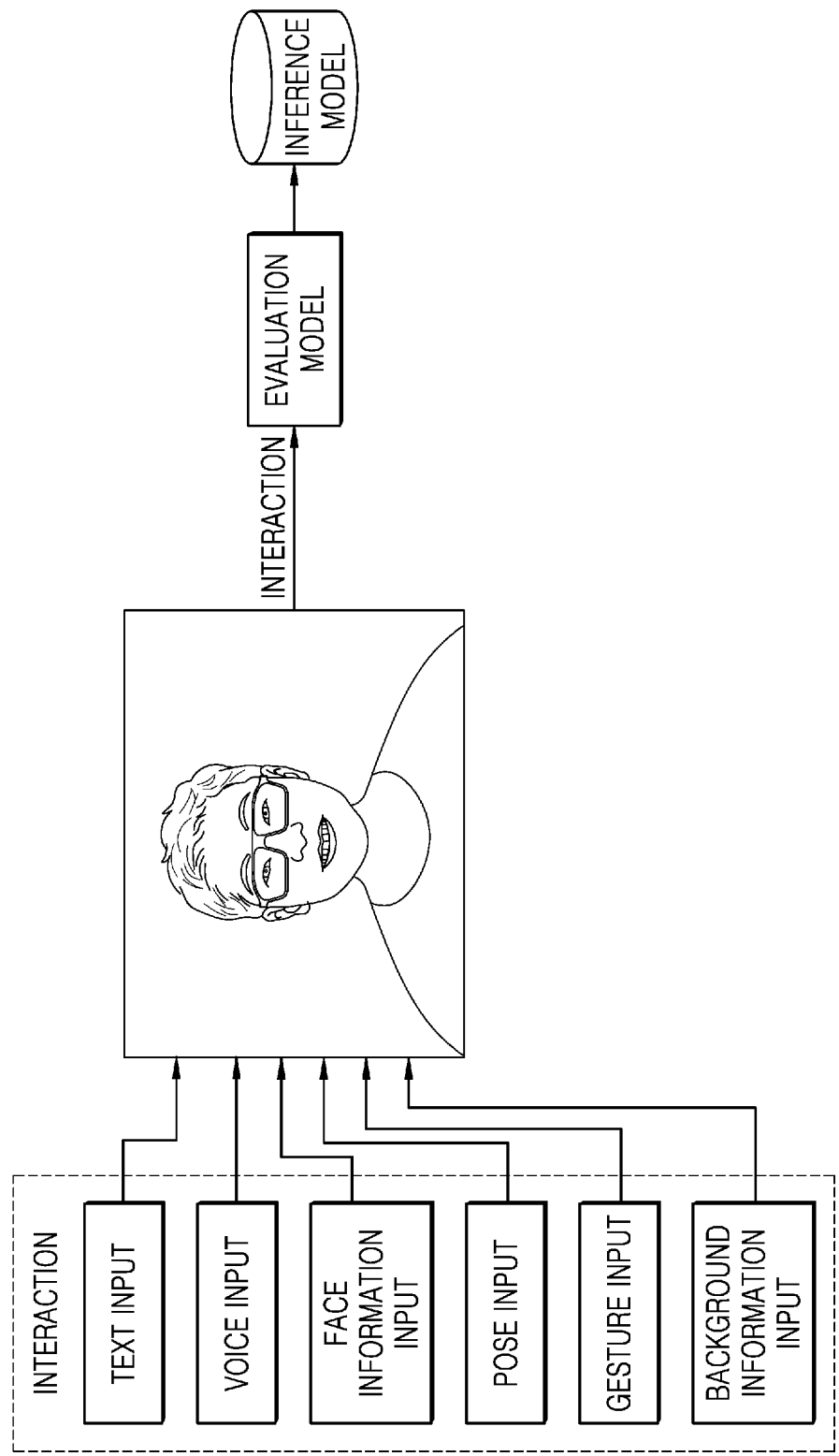
FIG. 6 schematically shows a process of deriving inference information according to the user-inputted interaction with respect to the video according to one embodiment of the present invention.

FIG. 6 schematically shows a process of deriving inference information according to the user-inputted interaction with respect to the video according to one embodiment of the present invention.

As shown in FIG. 6, the video corresponding to the user's current location in the video tree may be provided to the user through the video information providing step S10, the user may input an interaction for the provided video, and the user's next location in the video tree may be determined based on the interaction inputted by the user in the location determining step S11.

Specifically, the interaction may include at least one of text input, voice input, face information input, pose input, gesture input, and background information input with respect to a video, and in the location determining step S11, the next location of the user may be determined by applying inference information outputted by inputting the interaction into the machine-learned evaluation model 1800, and location condition information corresponding to the current location of the user in the video tree.

The user, through the video information providing step S10, may be provided with the video corresponding to the user's current location in the video tree, and the user may input an interaction for the provided video. Specifically, through the video information providing step S10, an interface for playing the video corresponding to the user's current location may be displayed in a user terminal corresponding to the user, and the user may input an interaction for the video through the interface.

The interaction inputted by the user through the interface may include at least one of text input, voice input, face information input, pose input, gesture input, and background information input. The interaction may correspond to the user's reaction, answer, emotion or the like with respect to the video provided to the user, and the user may add the interaction for the video by using and inputting one or more types of text, voice, face, pose, and background on the interface. Accordingly, the interaction inputted by the user on the interface may be transmitted to the server system 1000. Meanwhile, the face information input, the pose input, the gesture input, and the background information input may correspond to information respectively inputted by the user. However, according to another embodiment of the present invention, the user may input the interaction in a form of integrating the face information input, the pose input, the gesture input, and the background information input. For example, when the user inputs an image or video, as the interaction, that includes all of the user's location, face, pose, and gesture, the face information input, the pose input, the gesture input, and the background information input may be inputted in an integrated form.

To this end, the user terminal may be provided with a physical or virtual keyboard to receive a text input on the interface, may be provided with a microphone to receive a voice input, and may be provided with a camera to receive a facial expression, pose, or gesture input.

The server system 1000 may receive the interaction inputted by the user with respect to the video, and in the location determining step S11, the machine-learned evaluation model 1800 included in the server system 1000 may be used to derive inference information about the interaction. Thereafter, in the location determining step S11, it is checked whether the inference information satisfies the determination condition based on the inference information about the interaction and the determination condition for the video. Next, in the location determining step S11, the location movement condition corresponding to the above determination condition may be applied, so that the next location of the user may be determined. For example, when the user inputs an expression staring at another place as an interaction with respect to the video, the machine-learned evaluation model 1800 may derive inference information inferring that the interaction is a facial expression staring at another place, and in the location determining step S11, a presence of a discriminant condition corresponding to the inference information may be checked, and then the user's next location may be determined according to the location movement information corresponding to the determination condition.

Specifically, the inference information may correspond to inference information about the user's facial expression, age, and sex recognized through facial information input included in the interaction, or may correspond to information recognized through two or more inputs included in the interaction. For example, the inference information may correspond to inference information about a mental state or emotional state of the user, and a place in which the user is located, and the inference information may be recognized through two or more inputs among the text input, voice input, face information input, pose input, gesture input, and background information input included in the interaction.

Meanwhile, in another embodiment of the present invention, the interaction includes: a selection input for a specific option among a plurality of options for the video; and at least one input among the text input, voice input, face information input, pose input, gesture input, and background information input for the video, wherein, in the location determining step, the next location of the user may be determined by applying inference information outputted by inputting one or more inputs among the selection input for the specific option, the text input, voice input, facial expression input, pose input, gesture input and background information input for the video to the machine-learned evaluation model, and applying location condition information corresponding to the current location of the user in the video tree.

Specifically, in addition to the above-described at least one input among the text input, voice input, face information input, pose input, gesture input and background information input for the video, the interaction inputted by the user with respect to the video may further include a selection input for a specific option selected by the user among a plurality of options provided to the user for the video.

Accordingly, in the location determining step S11, it may be checked whether there is a determination condition corresponding to the inference information derived from the machine-learned evaluation model 1800 with respect to a selection input for the specific option and at least one input among the above-described text input, voice input, face information input, pose input, gesture input and background information input for the video, and then the next location of the user may be determined according to the location movement information corresponding to the determination condition.

For example, when there are multiple options, such as 'Option 1: Would you date me.' and 'Option 2: Goodbye.' with respect to the video provided to the user, the user may select Option 1 and additionally input an interaction for a face information input.

At this point, in the location determining step S11, when it is inferred that the user is in their 20s based on 'Option 1' selected by the user and the inference information about the user's age in the machine-learned evaluation model 1800 for the face information input, the user's next location may be determined through a video responding, "I don't date a person younger than me". Whereas, when it is inferred that the user is in their 30s, the next location of the user may be determined through a video responding, "Yes I will".

Accordingly, in the present invention, the user's location may not be simply determined by the user's selection, but the user's next location may also be determined by additionally considering an interaction including one or more among text input, voice input, face information input, pose input, gesture input, and background information input additionally inputted by the user.

Accordingly, in the present invention, other services through the video tree may be provided even for atypical interactions from the user in addition to moving the user's location in the video tree by selecting a specific option from among a plurality of preset options for the video, so that the user may be allowed to use the video interaction platform of the present invention more interestingly.

Meanwhile, specific embodiments of the machine-learned evaluation model 1800 will be described with reference to FIGS. 7 and 8 described later.

Figure 7:
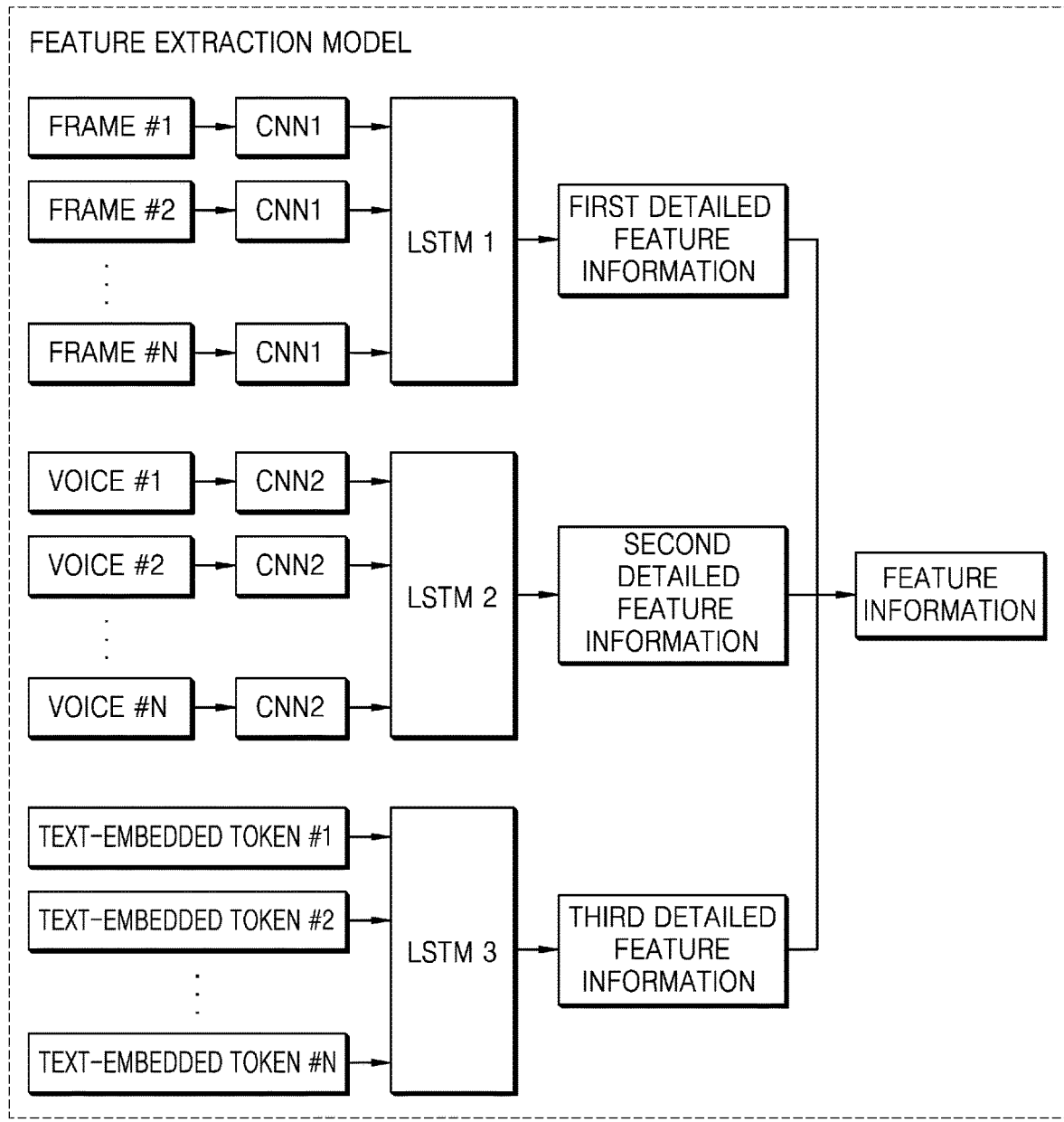
FIG. 7 schematically shows an internal configuration of a feature extraction model according to one embodiment of the present invention.

FIG. 7 schematically shows an internal configuration of a feature extraction model according to one embodiment of the present invention.

The machine-learned evaluation model 1800 described in FIG. 6 may include a feature extraction model and a feature inference model. The feature extraction model according to the embodiment shown in FIG. 7 may include: a first deep neural network for extracting spatial feature information for deriving a plurality of video feature information from video information of a plurality of frames of an interaction inputted by a user; a second deep neural network for extracting spatial feature information for deriving a plurality of voice feature information from the voice information of the interaction inputted by the user; a first recurrent neural network module for receiving the video feature information to derive first feature information; a second recurrent neural network module for receiving the plurality of voice feature information and deriving second feature information; and a third recurrent neural network module for deriving third feature information by receiving text information of the interaction.

The first deep neural network and the second deep neural network may correspond to a CNN module and the like. In one embodiment shown in FIG. 7, the first deep neural network may correspond to a first CNN module, and the second deep neural network may correspond to a second CNN module.

The first recurrent neural network module, the second recurrent neural network module, and the third recurrent neural network module may correspond to an RNN module, more specifically, an LSTM module which is a sub-concept of the RNN module. In one embodiment shown in FIG. 7, the first recurrent neural network module may correspond to a first LSTM module, the second recurrent neural network module may correspond to a second LSTM module, and the third recurrent neural network module may correspond to a third LSTM module.

Hereinafter, operations of the neural network according to one embodiment of the present invention will be described based on the embodiment shown in FIG. 7.

The frames may be generated by dividing images of the video at preset time intervals. In addition, a plurality of video feature information derived by the first CNN module may be preferably inputted to the first LSTM module sequentially in time series.

Meanwhile, preferably, feature information (such as pitch and intensity) about a voice for a preset time period or data of the voice itself may be inputted to the second CNN module, and voice feature information derived from the second CNN module may be inputted to the second LSTM module sequentially in time series. In addition, the feature information about the voice may include a pitch or intensity of the voice, however, may preferably include Mel-Frequency Cepstral Coefficient (MFCC) in which the voice is divided into a predetermined sections, Mel Filter Bank is applied to a spectrum for each section, and a feature is extracted through a Cepstral analysis.

The text information of the interaction into which the feature extraction model is inputted may preferably correspond to a plurality of vectors in which the text information is embedded in a token unit.

Meanwhile, the feature information (vector column) corresponding to the output of the feature extraction model may be derived based on the first detailed feature information, the second detailed feature information, and the third detailed feature information. For the simplest way, the feature information may be derived by simply combining the first detailed feature information, the second detailed feature information, and the third detailed feature information, or the feature information may also be derived by applying a weight and the like to the first detailed feature information, the second detailed feature information, and the third detailed feature information.

In addition, according to another embodiment of the present invention, the feature extraction model may be configured differently depending on the type of interaction that may be inputted by the user. For example, when the user is allowed to input an interaction including text, voice, and video in combination, the feature extraction model, as shown in FIG. 7, may include all of a component that derives feature information about video information, a component that derives feature information for voice information, and a component that derives feature information for text information. Meanwhile, when the user is allowed to input an interaction using one or more types of text, voice, and video, the feature extraction model may include only the component corresponding to the type.

Figure 8:
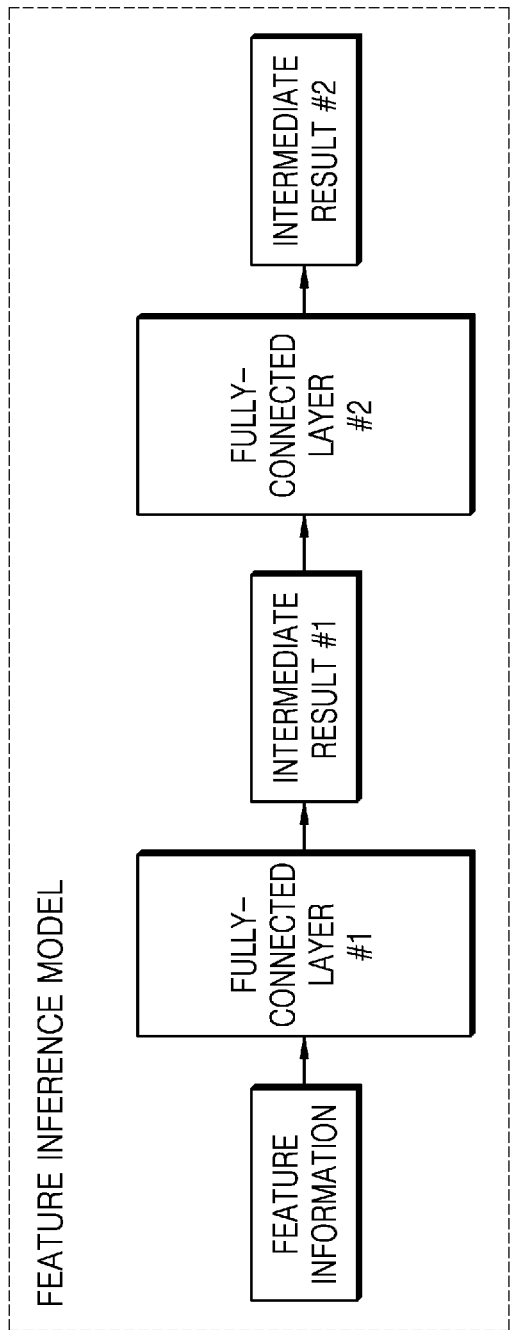
FIG. 8 schematically shows an internal configuration of a feature inference model according to one embodiment of the present invention.

FIG. 8 schematically shows an internal configuration of a feature inference model according to one embodiment of the present invention.

As shown in FIG. 8, the feature inference model derives a result value for the interaction inputted by the user by performing a process of deriving an intermediate result (a representative vector) by assigning a weight trained by a plurality of Fully Connected Layers to the feature information derived from the feature extraction model. For example, the above-described machine-learned evaluation model 1800 may analyze the interaction inputted by the user to derive inference information about the corresponding interaction.

The number of Fully Connected Layers is not limited to the number shown in FIG. 8. The feature inference model may include one or more Fully Connected Layers. When the feature inference model is composed of a single Fully Connected Layer, the intermediate result may be omitted.

Meanwhile, according to another embodiment of the present invention, the feature inference model may be implemented by using a Softmax activation function to process the issue of classification according to a preset criterion, or using a Sigmoid activation function or the like to derive a score.

Figure 9:
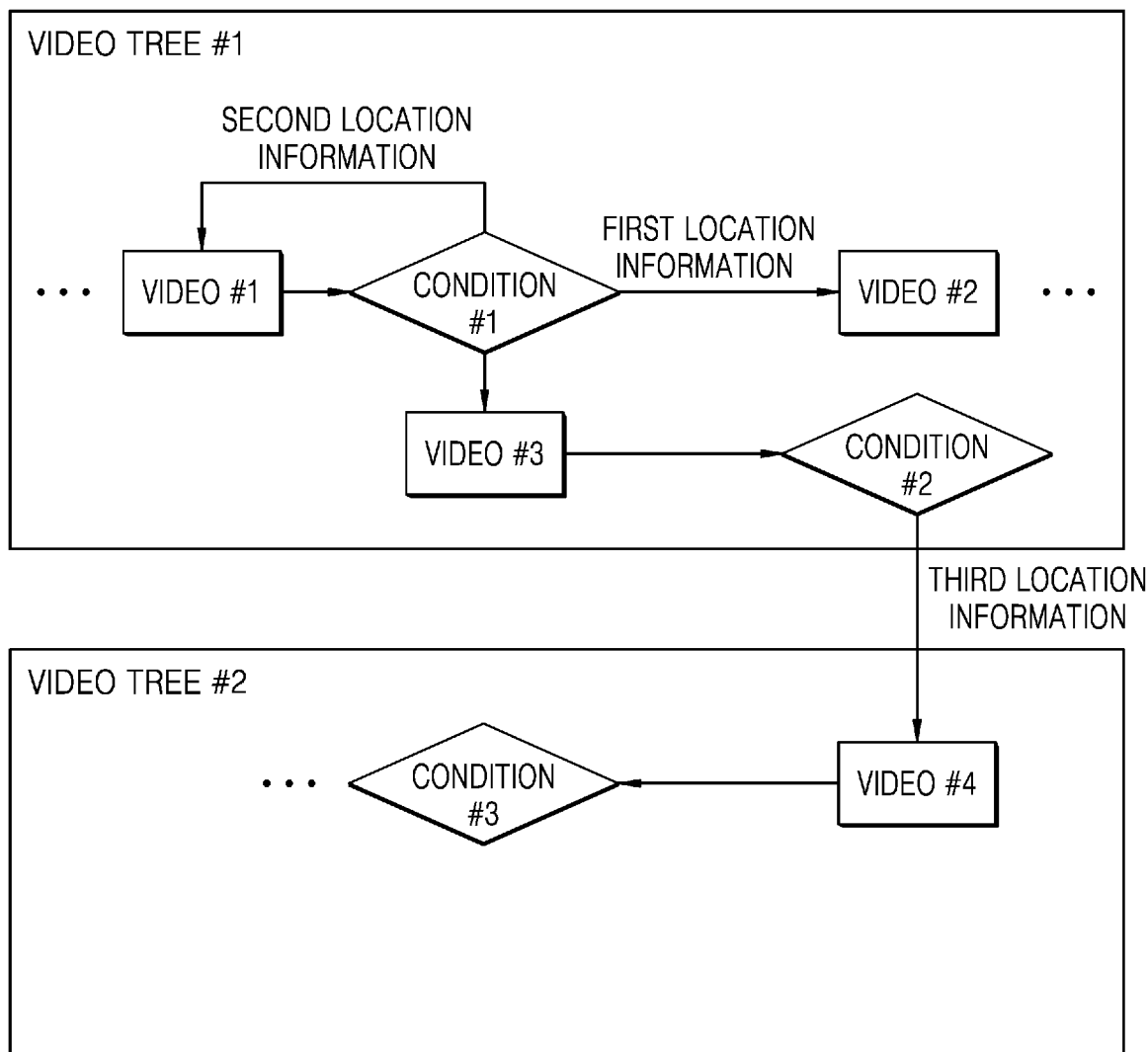
FIG. 9 schematically shows a configuration in which a plurality of video trees are connected according to one embodiment of the present invention.

FIG. 9 schematically shows a configuration in which a plurality of video trees are connected according to one embodiment of the present invention.

As shown in FIG. 9, the location movement information may include: first location movement information for moving the location of the user from the video corresponding to the interaction inputted by the user to another video based on the determination condition; and second location movement information for allowing the user to input an interaction again with respect to a video corresponding to the interaction previously inputted by the user based on the determination condition.

Specifically, the location movement information corresponding to information for moving the user's location according to the user's interaction in the video tree includes first location movement information and the second location movement information. when the interaction inputted by the user satisfies the determination condition of the video with respect to the video corresponding to the user's current location in the video tree, more specifically, when the interaction satisfies a specific detailed determination condition included in the determination condition, the first location movement information corresponds to information for moving the user's location from the video corresponding to the current location to another video.

Meanwhile, when the interaction inputted by the user satisfies the determination condition of the video with respect to the video corresponding to the user's current location in the video tree, more specifically, when the interaction satisfies a specific detailed determination condition included in the determination condition, the second location movement information corresponds to information for allowing the user to input an interaction again with respect to the video immediately previously interacted by the user, that is, the video corresponding to the user's current location. Accordingly, when the interaction inputted by the user with respect to the video of the current location corresponds to the second location movement information, the server system 1000 may provide the user with the video of the current location again so as to allow the user to input the interaction again, or may provide the user with a separate video requesting to perform the interaction again so as to allow the user to input the interaction again.

In addition, as shown in FIG. 9, a plurality of video trees may be stored in the server system 1000, the location movement information of the video tree may include third location movement information for moving the user's location to the specific video included in the other video tree based on the determination condition according to the user's interaction with respect to the video included in the video tree.

Specifically, the location movement information may further include third location movement information for determining the user's location within a single video tree and moving the user's location from the specific video tree to the location corresponding to the specific video in the other video tree. In other words, when the interaction inputted by the user satisfies the determination condition of the video with respect to the video corresponding to the user's current location in the video tree, more specifically, when the interaction satisfies a specific detailed determination condition included in the determination condition, the third location movement information corresponds to information for moving the user's location from the video corresponding to the current location to the specific video included in the other video tree.

Accordingly, since the location movement information of the present invention includes the above-described first location movement information, second location movement information, and third location movement information, various routes for the user's location can be set up, and accordingly, various other services according to one or more interactions of the user can be provided.

Figure 10:
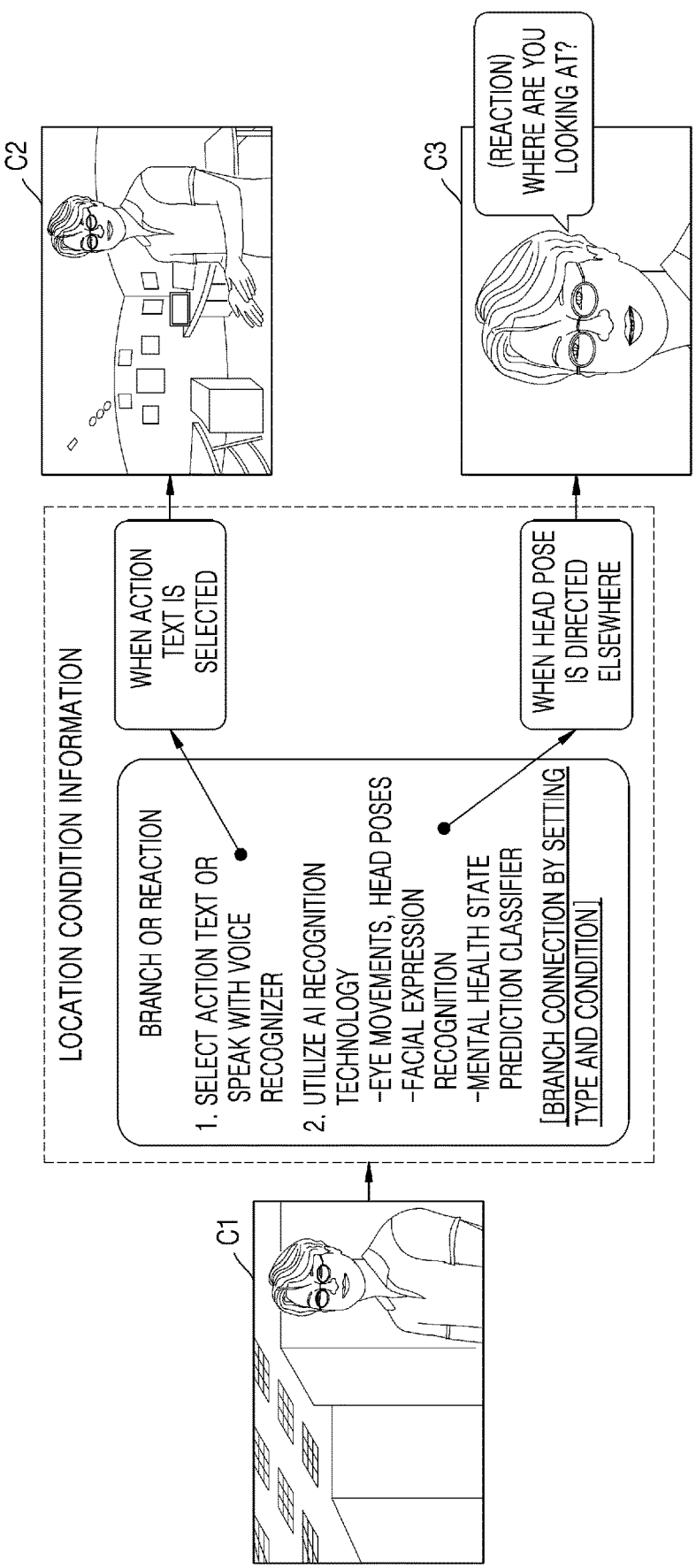
FIG. 10 schematically shows movements of a user's location according to user interaction in the video tree according to one embodiment of the present invention.

FIG. 10 schematically shows movements of a user's location according to user interaction in the video tree according to one embodiment of the present invention.

FIG. 10 is a view exemplarily showing the above-described video tree. When the user's current location is at video C1 in the video tree shown in FIG. 10, in the video information providing step S10, video C1 may be provided to the user, and the user may input an interaction for video C1.

As described in the location condition information of FIG. 10, the user may input various types of interactions with respect to video C1. For example, the user may input an interaction by selecting a specific text from among a plurality of preset action texts, input an interaction by vocalizing, or input an interaction by photographing a facial expression and/or pose. Meanwhile, the interaction may include only one among various types, but preferably, may include one or more types among the various types.

In the location determining step S11, a next location of the user in the video tree may be determined according to the interaction inputted by the user and the location condition information of the video. Referring to FIG. 10 as an example, in the location determining step S11 when the user selects a specific action text as an interaction for video C1, the user's next location is determined as video C2 according to the location movement information corresponding to the specific action text selected by the user.

Meanwhile, when the user inputs a facial expression or pose staring at another place as the interaction for video C1, in the location determining step S11, the machine-learned evaluation model 1800 is used to determine that the interaction is a stare at another place, and the user's next location is determined as video C3, based on the location movement information corresponding to the interaction of staring at another place.

In addition, when the location movement information for determining the user's next location as video C3 is the above-described first location movement information, the user may input an interaction for video C3. On the other hand, when the location movement information is the above-described second location movement information, the user may be provided with video C3 and input an interaction related to video C1 again.

Figure 11:
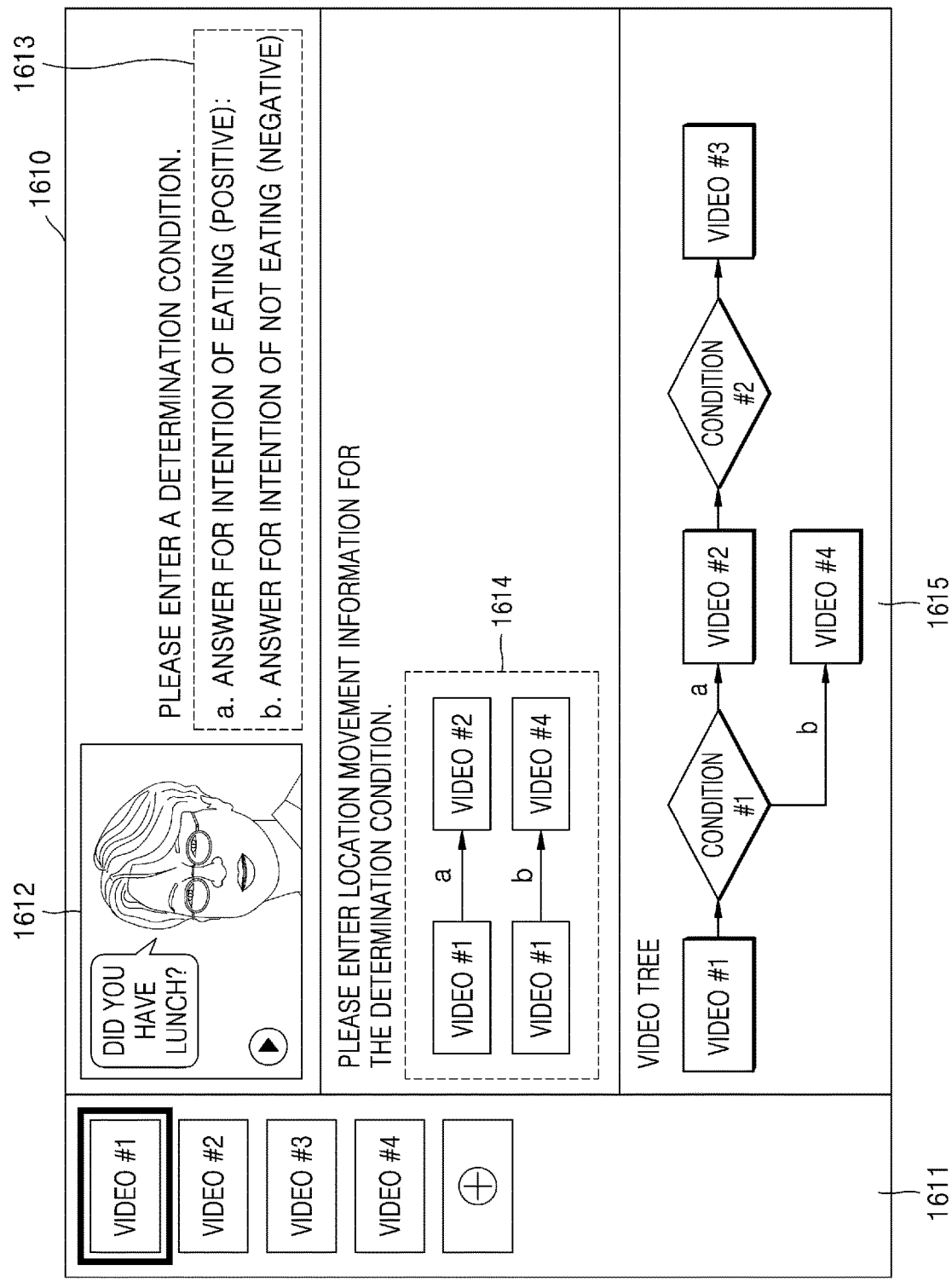
FIG. 11 schematically shows a video tree generation interface according to one embodiment of the present invention.

FIG. 11 schematically shows the video tree generation interface 1610 according to one embodiment of the present invention.

As shown in FIG. 11, the method for providing the video interaction platform may further include: a production builder providing step of receiving a plurality of videos according to a request of the user, and providing the user with a video tree generation interface 1610 for receiving settings of location condition information and result information for each video.

Specifically, the video interaction platform of the present invention may provide the user with the video tree pre-stored in the server system 1000, and may provide the video tree generation interface 1610 for allowing the user to directly generate the video tree according to the user's request, through the production builder providing step performed by the server system 1000.

As shown in FIG. 11, the video tree generation interface 1610 may be displayed on a user terminal of the user requesting the generation of the video tree, and the video tree generation interface 1610 may include areas for inputting various elements to set up the video tree.

The video tree generation interface 1610 may include a video upload area 1611, a video playback area 1612, a determination condition setting area 1613, a location movement information setting area 1614, and a video tree preview area 1615. The video upload area 1611 corresponds to an area in which a plurality of videos included in the video tree can be uploaded. The user may upload a plurality of videos through the video upload area 1611, and when a specific uploaded video (video #1 in FIG. 11) is selected, a determination condition and location movement information for the specific video may be set in the video tree generation interface 1610.

The video playback area 1612 corresponds to an area in which the specific video selected by the user in the video upload area 1611 can be checked. When the user selects a playback element included in the video playback area 1612, the video may be played in the video playback area 1612.

The determination condition setting area 1613 corresponds to an area in which the determination condition for the selected video can be set. The user may set a determination condition for the interaction inputted by the user with respect to the video in the determination condition setting area 1613, specifically, one or more detailed determination conditions included in the above determination condition. For example, as shown in FIG. 11, a user who wants to generate a video tree with a detailed determination condition for a video asking whether lunch is eaten may set, on the determination condition setting area 1613, a detailed determination condition for a positive interaction that lunch is eaten (FIG. 11a), and a detailed determination condition (FIG. 11b) for a negative interaction that lunch is not eaten.

The location movement information setting area 1614 corresponds to an area in which location movement information for determining the user's next location can be set when the interaction for the video inputted by the user satisfies the specific detailed determination condition. The user may set the location movement information by setting the video corresponding to the user's next location for each detailed determination condition with respect to the video. For example, as shown in FIG. 11, a user generating the video tree may set location movement information for, when an interaction inputted by a user using a video tree to be generated for video #1 satisfies a detailed determination conditions for a positive interaction, determining the user's next location to a location corresponding to video #2, and may set the location movement information for, when the interaction inputted by the user satisfies a detailed determination conditions for a negative interaction, determining the user's next location to a location corresponding to video #4. In addition, in the location movement information setting area 1614, it may be set to provide result information to the user as the next location corresponding to the detailed determination condition in the video tree to be generated. For example, when the interaction inputted by the user satisfies a specific detailed determination condition, it may be set to provide the user with result information including other service connection information for providing other services according to one or more interactions of the user inputted in the video tree, and/or a final result according to a location history of the user in the video tree or one or more interactions inputted by the user in the video tree, and/or the location history of the user in the video tree.

the video tree preview area 1615 corresponds to an area in which an overall shape of the video tree having been set or being set through the video tree generation interface 1610 is visually schematically displayed. Accordingly, the user may effectively review the video tree to be generated, through the video tree preview area 1615.

Figure 12:
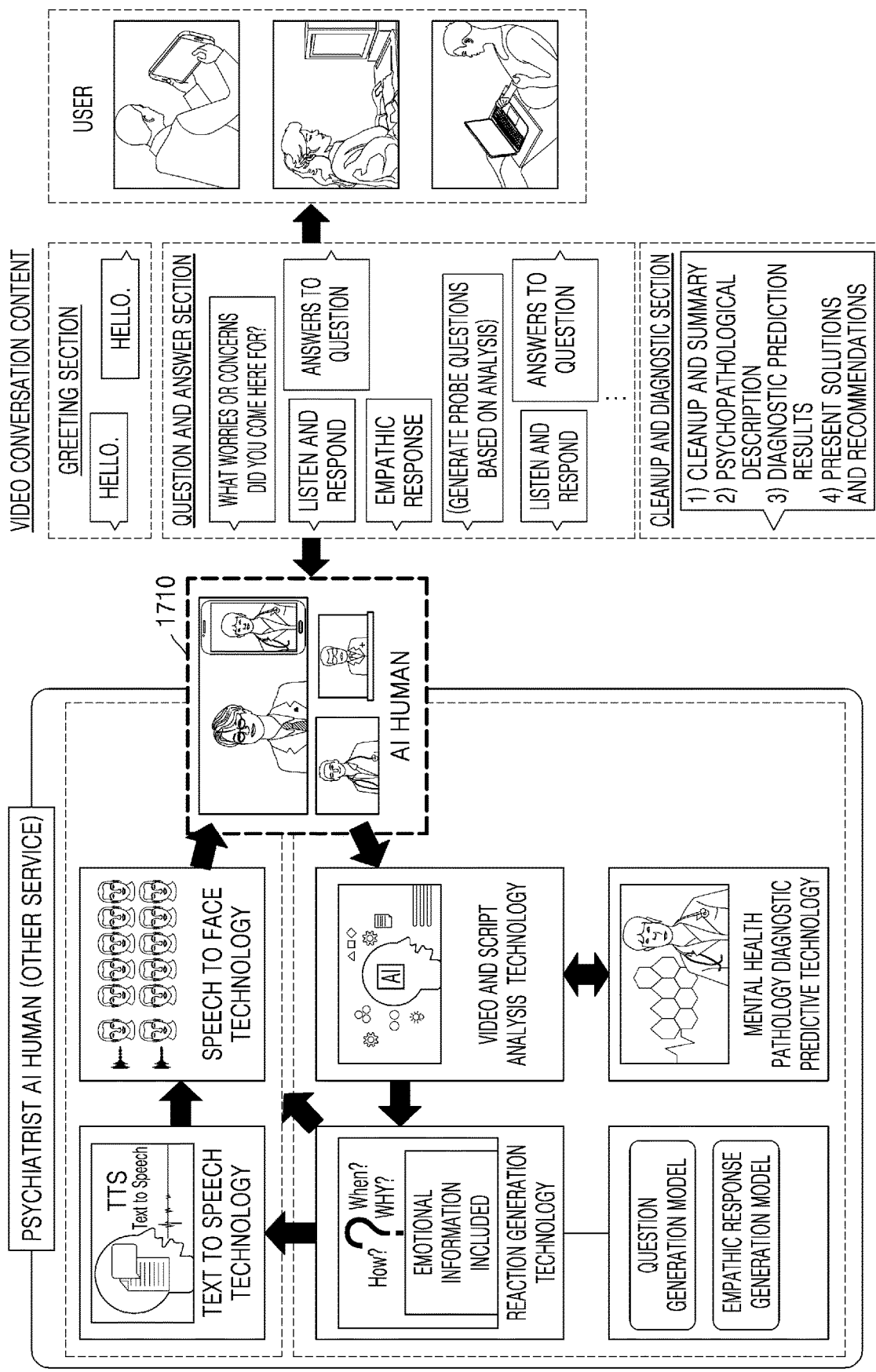
FIG. 12 schematically shows a process of providing other services according to one embodiment of the present invention.

FIG. 12 schematically shows a process of providing other services according to one embodiment of the present invention.

As shown in FIG. 12, the result information corresponding to the location of the user in the video tree or the interaction of the user with the video may include other service connection information for providing other services to the user, and the other service connected to the other service connection information provided in the result information providing step S13 may derive response information for the user interaction through a separate machine-learned evaluation model, and provide the user with an object 1710 uttered according to the response information.

According to one embodiment of the present invention, the other services provided to the user through the video tree may be implemented by providing non-face-to-face consultations with experts or preset contents. Preferably, the other service may be implemented in the form of, like an artificial intelligent (AI) human, generating response information according to the user interaction and providing the user with the object 1710 uttered according to the response information.

Accordingly, the other service server 3000 providing other services or the other service providing unit 1700 included in the server system 1000 may use a separate machine-learned evaluation model in order to infer interactions with respect to answers for questions inputted by the user receiving the other services, and may derive response information in the form of text corresponding to the interaction inputted by the user according to the inference information derived through the machine-learned evaluation model. Next, the other service server 3000 or the other service providing unit 1700 may provide the derived response information to the user through the object 1710.

Specifically, the object 1710 may be implemented in the form of simply indicating the response information in the form of text itself, and the other service server 3000 or the other service providing unit 1700 may be implemented in the form of converting the response information into a voice form and providing the voice-converted response information to the user through the object 1710 in the audio form.

Preferably, the other service server 3000 or the other service providing unit 1700 may be implemented in the form of converting the response information into a voice form and deriving facial motion information for allowing the object 1710 to speak naturally based on the voice-converted response information, so as to utter the voice-converted response information while a facial expression of the object 1710 changes according to the voice-converted response information and the face motion information. Meanwhile, when being implemented in the above form, the object 1710 may have a human appearance or a face shape. In addition, the other service server 3000 or the other service providing unit 1700 may include a text-to-speech (TTS) module for converting response information in a text form into a voice form, and a speech-to-face (STF) module for generating a facial motion of the object 1710 according to the response information converted into the voice form. Meanwhile, the TTS module and the STF module may be implemented by various schemes used in the related art.

Accordingly, the other services provided to the user from the other service server 3000 or the other service providing unit 1700 may be implemented through the object 1710 uttered according to the user's interaction, so that the user-customized services can be provided, and the user can be interested therein.

2. Method for Generating Interactive Content

Through the above-mentioned '1. Method For Providing Video Interaction Platform', The method for providing the video tree to the user in the video interaction platform implemented by the server system 1000, and providing the next video according to the user's interaction with the specific video has been described.

Hereinafter, a method for allowing a user to produce a video tree (interactive content) through the video interaction platform will be described. Meanwhile, the interactive content described below may correspond to the above-described video tree, and a plurality of nodes included in the interactive content may correspond to a plurality of videos included in the above-described video tree. In addition, the service server 1000 described below may correspond to the above-described server system 1000, and the method for generating the interactive content may be understood as being performed in the above-described production builder providing unit 1600.

Figure 13:
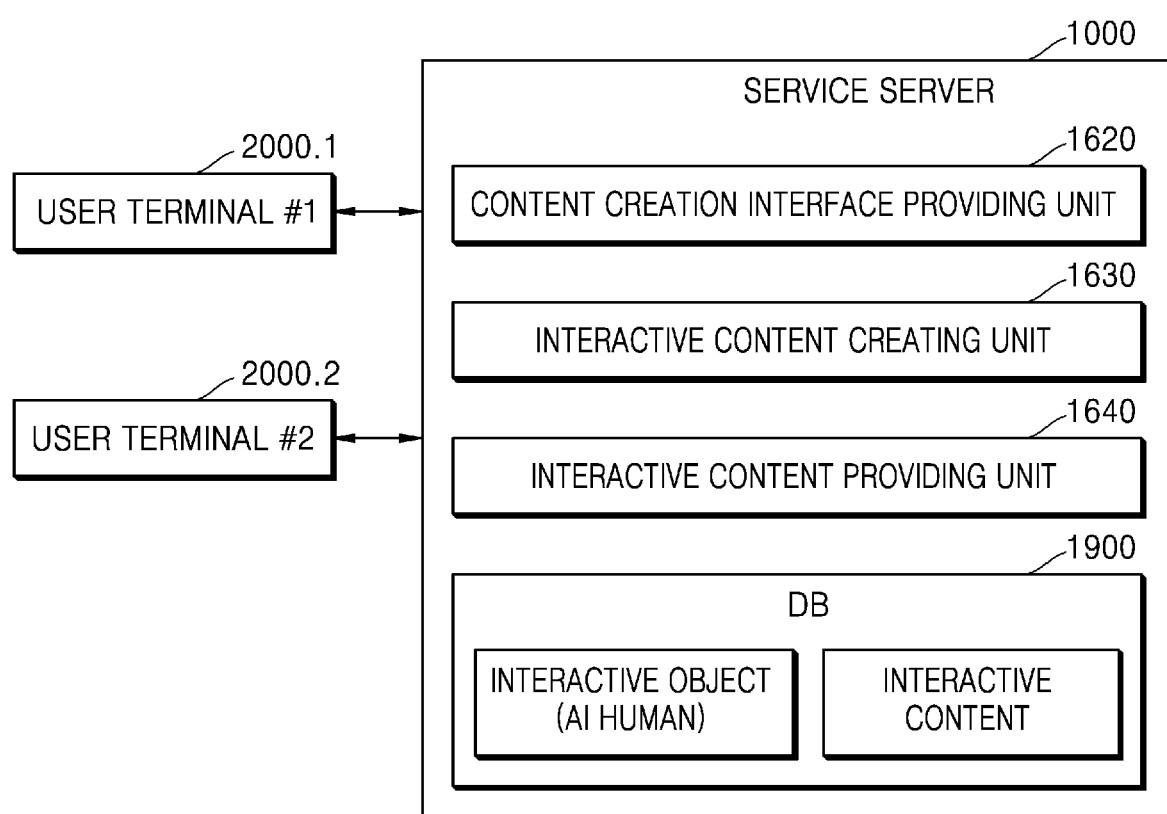
FIG. 13 schematically shows a service server that performs the method for generating interactive content according to one embodiment of the present invention.

FIG. 13 schematically shows the service server that performs the method for generating the interactive content according to one embodiment of the present invention.

As shown in FIG. 13, the service server 1000 may correspond to the above-described server system 1000. The service server 1000 may communicate with one or more user terminals 2000.1 and 2000.2 (hereinafter, 2000) to generate interactive content, and may provide the generated interactive content to other users.

Specifically, in order to perform the method for generating the interactive content of the present invention, the service server 1000 may include a content generation interface providing unit 1620, an interactive content generating unit 1630, an interactive content providing unit 1640, and a DB 1900.

The content generation interface providing unit 1620 may perform the content generation interface providing step S100 and S110, a content generation interface 100 may be requested from the user terminal 2000 of the user who wants to generate interactive content, and the content generation interface 100 may be provided to the user terminal 2000 according to the request, so that the content generation interface 100 may be displayed on the user terminal 2000. Meanwhile, the user of the user terminal 2000 may input each node generation information for generating each node included in the interactive content on the content generation interface 100, and the content generation interface providing unit 1620 may receive the node generation information from the user terminal 2000.

The interactive content generating unit 1630 may perform a node generation step S120, so that a plurality of nodes may be generated based on the received node generation information, and finally, interactive content including the nodes may be generated. Specifically, in the node generation step S120, each node may be generated according to each received node generation information. At this point, each generated node may not exist independently, but may be configured as a kind of tree in which nodes are connected to each other according to the condition information included in the node generation information.

The interactive content providing unit 1640 may provide one or more interactive contents generated through the interactive content generating unit 1630 to the other user terminal 2000. For example, the interactive content providing unit 1640 may provide a specific interactive content selected by a user of the other user terminal 2000, or may recommend and provide a specific interactive content suitable for the user of the other user terminal 2000.

According to another embodiment of the present invention, the interactive content providing unit 1640 may be understood as a configuration including covering the processes performed in the above-described video information providing unit 1100, location determining unit 1200, result information providing unit 1300, user interaction information transmitting unit 1400, user location history transmitting unit 1500 and other service providing unit 1700.

Meanwhile, the DB 1900 may store a plurality of pieces of information required for performing the method for generating the interactive content of the present invention in the service server 1000. Specifically, the DB 1900 includes: one or more interactive objects. The interactive object corresponds to an object capable of uttering text information included in the node generation information inputted by the user. For example, the interactive object may be implemented in the form of displaying text information as it is, or may be implemented in the form of converting the text information into voice form so that the interactive object outputs the text information in voice form as audio. Preferably, the interactive object may output text information converted into the voice form as audio and one or more non-verbal elements such as mouth shape, gesture, facial expression, and intonation may be additionally implemented upon outputting the audio. The one or more interactive objects stored in the DB 1900 may correspond to various shapes of objects, such as men, women, and anthropomorphic animals and characters.

In addition, one or more interactive contents generated by the interactive content generation unit 1630 may be stored in the DB 1900, and the stored interactive content may be provided to a user terminal 2000 of a user having produced the interactive content, or may be provided to a user terminal 2000 of another user wanting to use the interactive content.

Meanwhile, the user terminal 2000 may generate the interactive content or use the generated interactive content by communicating with the service server 1000 through a separate application installed to communicate with the service server 1000 performing the method for generating the interactive content of the present invention, or a separate web page implemented by an installed web browser.

Figure 14:
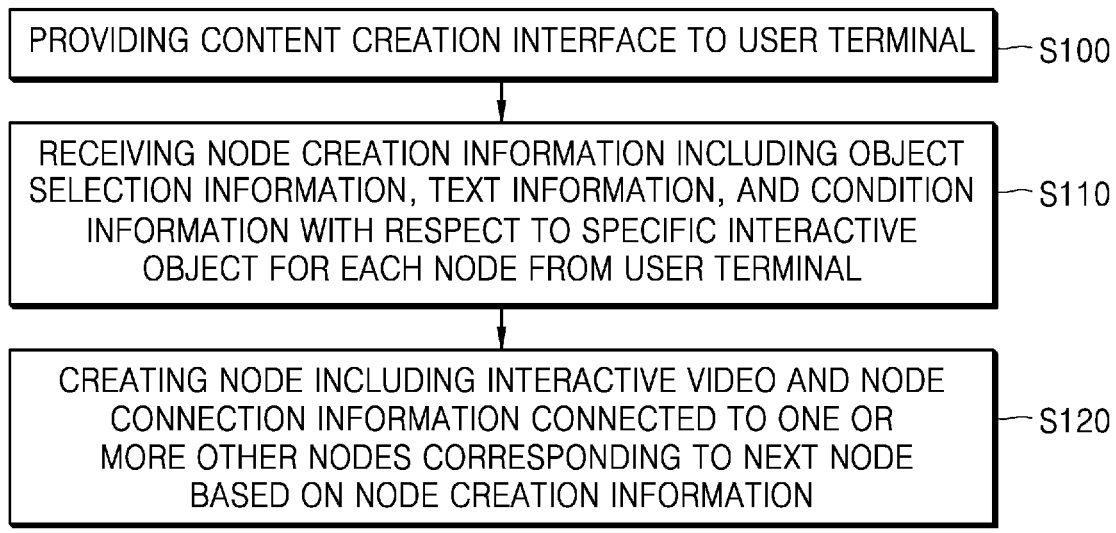
FIG. 14 schematically shows detailed steps of the method for generating interactive content according to one embodiment of the present invention.

FIG. 14 schematically shows detailed steps of the method for generating interactive content according to one embodiment of the present invention.

As shown in FIG. 14, in the method for generating the interactive content and performed in the service server 1000 communicating with one or more user terminals 2000 and including one or more processors and one or more memories, in which one or more interactive objects are stored in the service server 1000, the method for generating the interactive content may include: providing a content generation interface 100 to a user terminal 2000, a content generation interface providing step (S100 and S110) of, on the content generation interface 100 from a user of the user terminal 2000, receiving node generation information that includes object selection information including selection of a specific interactive object among the one or more interactive objects for each of one or more nodes, and text information, and further includes condition information for proceeding from the node to one or more other nodes according to an input of the user; and a node generation step (S120) of generating a node including node connection information connected to one or more other nodes that are next nodes, based on the node generation information, and according to an interactive video in which the specific interactive object utters corresponding text information and corresponding condition information or preset basic condition information in the case that the corresponding condition information is not inputted.

Specifically, in the content generation interface providing step S100 and S110, the content generation interface 100 is provided to the user terminal 2000 of the user wanting to generate the interactive content (S100). More specifically, the user terminal 2000 may transmit request information for requesting the provision of the content generation interface 100 to the service server 1000 according to the user's input, and in the content generation interface providing step S100 and S110, the content generation interface 100 may be provided to the corresponding user terminal 2000 according to the request information (S100).

Accordingly, the provided content generation interface 100 may be displayed on the user terminal 2000, and the user of the user terminal 2000 may input one or more node generation information for generating each node with respect to each of one or more nodes included in the interactive content to be generated on the content generation interface 100. Specifically, the node generation information may include text information to be provided by the node, object selection information for a specific interactive object for uttering the text information among the one or more interactive objects stored in the service server 1000, and condition information for transition from one node to one or more other nodes that are next nodes. Meanwhile, in the content generation interface providing step S100 and S110, the one or more node generation information may be received from the user terminal 2000 (S110).

Meanwhile, in another embodiment of the present invention, the user may input only object selection information and text information through the content generation interface 100 without inputting condition information, and in the content generation interface providing step S100 and S110, node generation information that does not include condition information may be received from the user terminal 2000.

In the above case, since the condition information is not included in the node generation information in the node generation step S120 described later, a node may be generated using the basic condition information corresponding to separate preset condition information, and the received node generation information.

In addition, in another embodiment of the present invention, the user may input condition information through the content generation interface 100, in which the condition information may be information denoting that the basic condition information is used.

According to one embodiment of the present invention, the object selection information included in each of a plurality of node generation information inputted by the user to generate a plurality of nodes included in the interactive content may all correspond to the same specific interactive object. However, according to another embodiment of the present invention, the object selection information included in each of a plurality of node generation information inputted by the user to generate a plurality of nodes included in the interactive content may correspond to a specific interactive object different for each node generation information. Accordingly, text information of a specific node of the generated interactive content may be uttered through a specific interactive object, and text information for another node may be uttered using an interactive object different from the specific interactive object.

When one or more node generation information is received in the content generation interface providing step S100 and S110, one or more nodes are generated based on the one or more node generation information in the node generation step S120. Each of the one or more nodes generated in the node generation step S120 includes an interactive video and node connection information.

Specifically, the interactive video corresponds to a video in which the specific interactive object utters the text information in a form including a voice and one or more non-verbal elements, based on the text information included in the node generation information and the object selection information for the specific interactive object. Meanwhile, the node connection information corresponds to information for moving the user's location from the node to one or more other nodes that are next nodes according to a predetermined condition based on the condition information included in the node generation information.

In addition, as described above, when receiving node generation information that does not include the condition information in the content generation interface providing step S100 and S110, or node generation information that uses basic condition information as condition information, node connection information may be generated based on the preset basic condition information stored in the service server 1000, in the node generation step S120.

For example, when a user (a user who consumes interactive content) does not act on an input such as interaction with respect to an interactive video, the basic condition information may correspond to information for generating node connection information to be connected to a specific node (current node or another node).

According to another embodiment of the present invention, even when the node generation information including the condition information is received in the content generation interface providing step S100 and S110, the node may be generated in the node generation step S120 by additionally considering the basic condition information to the condition information. Specifically, when the condition information does not include a condition corresponding to the basic condition information, the basic condition information may be additionally applied in the node generation step S120.

Figure 15:
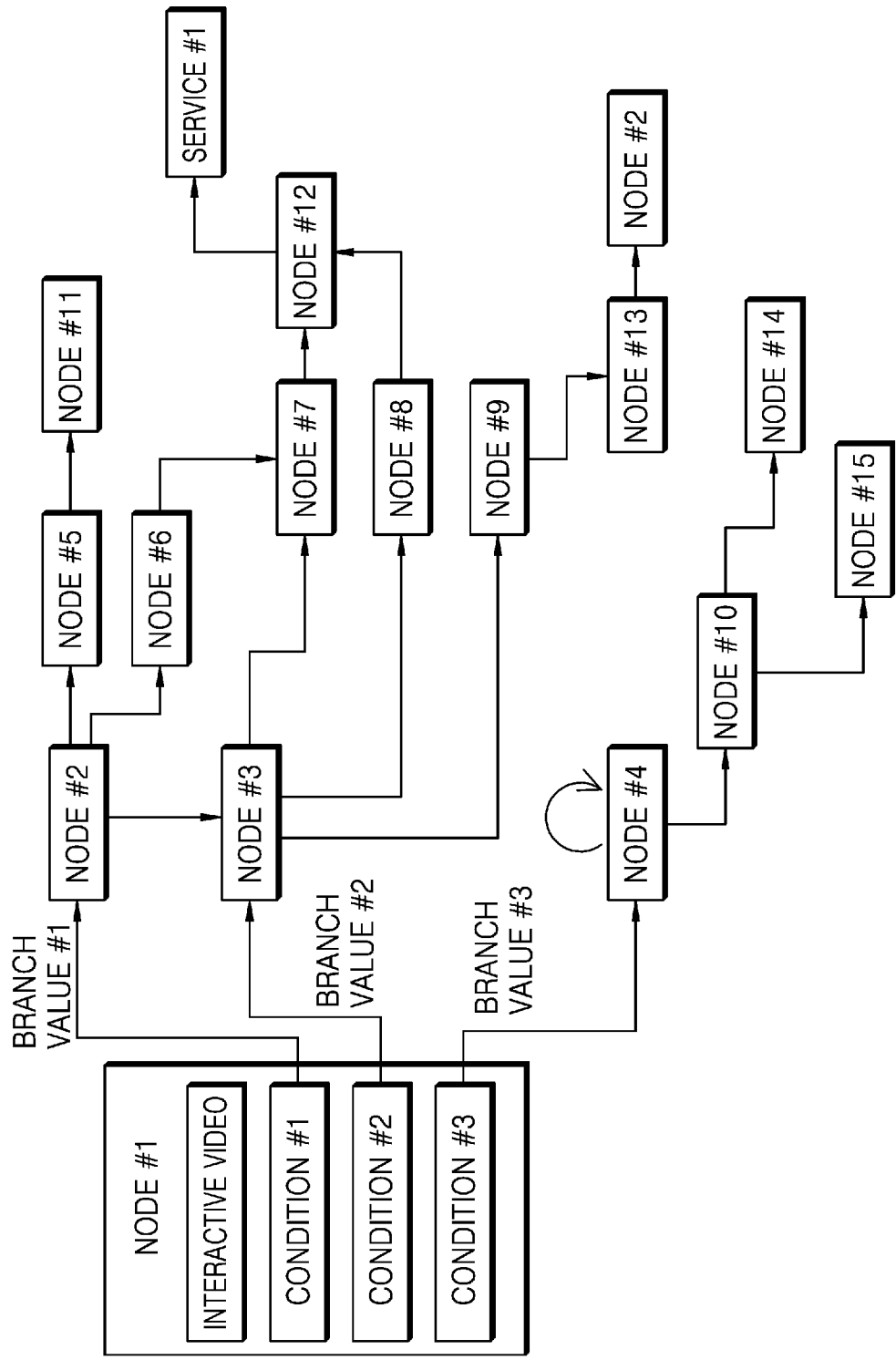
FIG. 15 schematically shows the interactive content generated through the method for generating interactive content according to one embodiment of the present invention.

Meanwhile, as described above, the interactive content generation unit 1630 may perform the node generation step S120 to generate one or more nodes, and the interactive content finally generated by the interactive content generation unit 1630 may have a structure in which generated nodes are connected to each other, as shown in FIG. 15 described later.

FIG. 15 schematically shows the interactive content generated through the method for generating interactive content according to one embodiment of the present invention.

As shown in FIG. 15, the interactive content includes a plurality of nodes, and each node is connected to one or more other nodes by corresponding node connection information.

Specifically, the interactive content generated by the interactive content generation unit 1630 may have a kind of tree structure in which a plurality of nodes are connected to each other. Each node included in the interactive content includes an interactive video and node connection information as with node #1 shown in FIG. 15.

Meanwhile, the node connection information may include: one or more condition values for each of one or more interactions in which a user may respond to a corresponding node; and branch values for one or more other nodes transited within the interactive content when the one or more condition values are satisfied.

Specifically, the node connection information may include one or more condition values and one or more branch values according to the one or more condition values. The one or more condition values may denote a specific interaction in which the user reacts to the interactive video included in the corresponding node. For example, the condition value may correspond to the case when the user speaks a specific word or sentence for the interactive video, when the user selects a specific option among a plurality of options given through the interactive video, when the user makes a specific facial expression or gesture for the interactive video, and when the user's reaction to the interactive video is a specific emotion.

Meanwhile, when the user's interaction satisfies the condition value corresponding to the branch value, the one or more branch values may refer to information in which the user's location is moved from a corresponding node to one or more other nodes corresponding to the next node. For example, when the user's interaction for the interactive video of node #1 shown in FIG. 15 satisfies condition #1, the user's location corresponding to node #1 may be moved to a location corresponding to node #2 by the branch value #1.

The node connection information may be generated based on condition information received from the user, or preset basic condition information when the user does not input the condition information.

Accordingly, the user using the interactive content may perform the interaction on the interactive video included in the node from the first node (node #1 in FIG. 15), and the user's location may be moved to another node according to the condition value and branch value corresponding to the performed interaction. Finally the user may be located at the final node (node #11, node #12, node #13, node #14, and node #15 in FIG. 15), and accordingly, the use of interactive content may be terminated, or an additional service (service #1 and service #2 in FIG. 15) may be provided according to the user interaction in the final node as in node #12 and node #13 shown in FIG. 15.

Meanwhile, according to another embodiment of the present invention, the node connection information is not understood only as being connected to one or more other nodes corresponding to the next node. As shown in node #4 in FIG. 15, the node connection information may be additionally understood as repeating the interaction for the interactive video of the corresponding node according to a specific interaction of the user.

Figure 16:
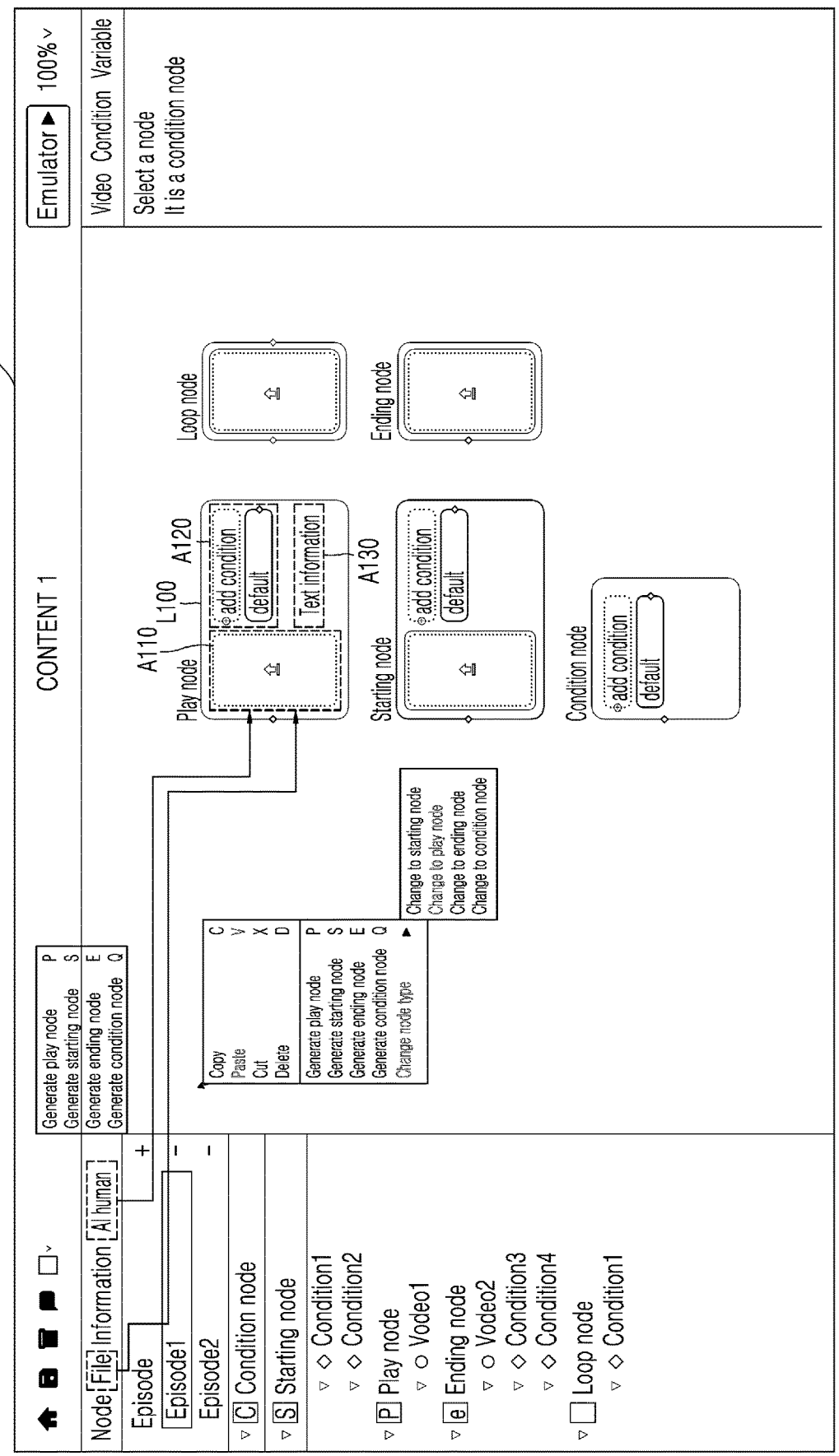
FIG. 16 schematically shows a screen of a user terminal displaying a content generation interface according to one embodiment of the present invention.

FIG. 16 schematically shows a screen of the user terminal 2000 on which the content generation interface 100 is displayed according to one embodiment of the present invention.

As shown in FIG. 16, in the content generation interface 100, one or more node setting layers L100 for receiving node generation information for each of one or more nodes according to the user's input may be displayed, and the node setting layer L100 may include: a video confirmation element E10 for displaying a playback layer L200 for generating and playing an interactive video in which a specific interactive object included in the node generation information utters text information included in the node generation information according to the user's selection input.

Specifically, through the content generation interface providing step S100 and S110, the user terminal 2000 may display the received content generation interface 100, and the content generation interface 100 may display one or more node setting layers L100 according to the user's input.

More specifically, the content generation interface 100 may include: a state layer, as shown on the left side of FIG. 15, that displays interactive content to be generated (episode in FIG. 15) and a structure and state of one or more nodes included in the interactive content; a node editing layer, as shown at a center in FIG. 15, that displays one or more node setting layers L100 for each of one or more nodes to be generated; and a condition setting layer, as shown on the right side in FIG. 15, capable of setting condition information for a node corresponding to a specific node setting layer L100 selected on the node editing layer.

In order to display the node setting layer L100 for allowing the user to input node generation information on the content generation interface 100, when the user selects a node generation element E20 (the fifth element in FIG. 15) among a plurality of elements shown at the upper left side in FIG. 15, a separate pop-up window may be overlaid on the content generation interface 100, and when a specific type is selected from a plurality of types of nodes included in the pop-up window, the node setting layer L100 may be displayed on the node editing layer.

Meanwhile, in regard to a separate method for displaying the node setting layer L100, a separate pop-up window may be overlaid on the content generation interface 100 when the user performs a preset input such as right-click on the node editing layer of the content generation interface 100, and the node setting layer L100 may be displayed on the node editing layer when a specific type is selected from a plurality of types of nodes included in the pop-up window.

In another embodiment of the present invention, the node setting layer L100 may be directly displayed on the node editing layer without overlaying the separate pop-up window.

The node setting layer L100 displayed on the node editing layer includes an object selection area A110, a condition input area A120, and a text input area A130.

The object selection area A110 may display information about the specific interactive object selected by the user, or information about a separate video selected when the user selects a separate video corresponding to the interactive video without selecting the specific interactive object.

Specifically, when the 'AI Human' of the content generation interface 100 is selected as shown in FIG. 15, a list of one or more interactive objects stored in the service server 1000 may be displayed, and when the user selects a specific interactive object from the list, information about the selected specific interactive object may be displayed in the object selection area A110.

In addition, as shown in FIG. 15, when a 'file' of the content generation interface 100 is selected, a list of one or more videos uploaded by the user to the service server 1000 may be displayed, and when the user selects a specific video from the list, information about the selected video may be displayed in the object selection area A110.

The user may input condition information for the corresponding node through the condition input area A120. Specifically, the user may input condition information for the corresponding node on the condition input area A120, and condition information inputted through the condition setting layer may be displayed in the condition input area A120 when the input condition information is displayed on the condition input area A120 or when the user inputs condition information for the corresponding node on the above-described condition setting layer. This will be described in more detail with reference to FIG. 18.

The user may input text information necessary for allowing the selected specific interactive object to be uttered through the text input area A130. Specifically, the text information may correspond to a kind of dialogue (script) uttered by the specific interactive object. In addition, the user may directly input text information in the text input area A130 of the present invention, or input (upload) a document file including text information in the text input area A130, so that the text information may also be inputted.

Meanwhile, when the user inputs node generation information for generating a node on one or more node setting layers L100 in the content generation interface 100, and then the user selects a content generation element corresponding to the 'emulator' shown at the upper right side in FIG. 16, the interactive content may be generated.

Figure 17A:
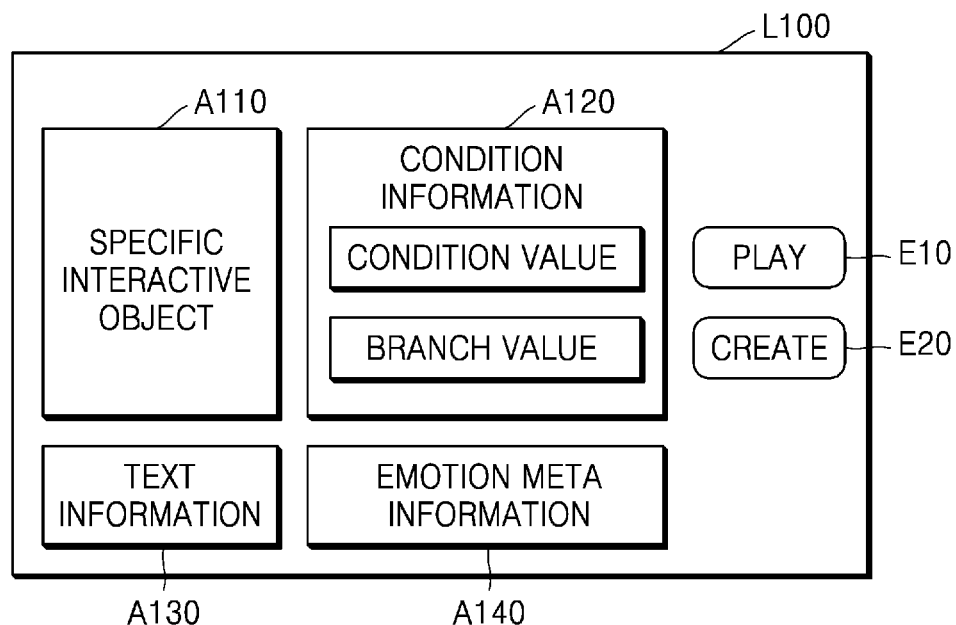
FIGS. 17A and 17B schematically show a node setting layer and a playback layer according to one embodiment of the present invention.
Figure 17B:

FIGS. 17A and 17B schematically show the node setting layer L100 and the playback layer L200 according to one embodiment of the present invention.

As shown in FIGS. 17A and 17B, one or more node setting layers L100 for receiving node generation information for each of one or more nodes according to the user's input may be displayed in the content generation interface 100, and the node setting layer L100 may include a video confirmation element E10 for displaying a playback layer L200 for generating and playing an interactive video in which a specific interactive object included in the node generation information utters text information included in the node generation information according to the user's selection input.

Specifically, the node setting layer L100 may include an object selection area A110, a condition input area A120, and a text input area A130 as described in FIG. 16, and the node setting layer L100 may further include, additionally, an emotion input area A140, a video confirmation element E10, and a node generation element E20 as shown in FIG. 17A.

The user may input emotion meta information for a corresponding node through the emotion input area A140. Specifically, when the interactive object utters text information for the corresponding node, the emotion meta information may refer to information for granting one or more non-verbal elements to one or more utterance units (units such as words, sentences, and paragraphs) included in the text information. This will be described later with reference to FIGS. 19A and 19B.

The video confirmation element E10 may call the playback layer L200 when the user performs a selection input for the video confirmation element E10. In addition, as shown in FIG. 17B, the playback layer L200 may display an interactive video generated based on the node generation information including the object selection information, text information, condition information and emotion meta information inputted to the node setting layer L100, and the user may check in advance the interactive video generated according to the specific interactive object, text information, and emotion meta information selected by the user through the playback layer L200 before generating the corresponding node.

When the user performs a selection input for the node generation element E20, the service server 1000 may generate a node according to the node generation information inputted by the user on the node setting layer L100, and the node generated at this point may be connected to one or more other nodes corresponding to the next node of the node, according to the condition information included in the node generation information.

Figure 18:
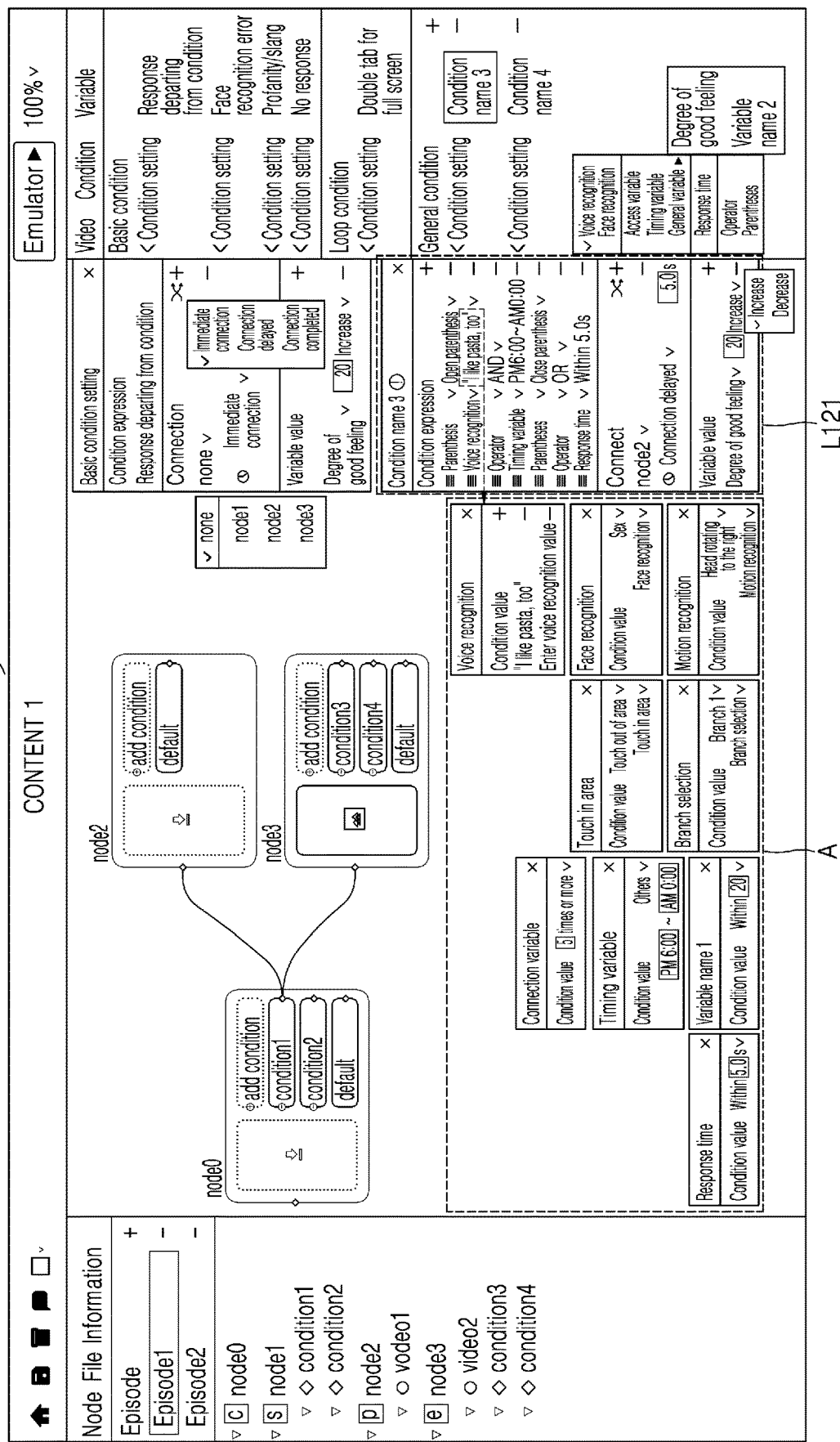
FIG. 18 schematically shows a screen of a user terminal for setting one or more condition values and branch values for a node in the content generation interface according to one embodiment of the present invention.

FIG. 18 schematically shows a screen of the user terminal 2000 for setting one or more condition values and branch values for a node in the content generation interface 100 according to one embodiment of the present invention.

The drawing shown in FIG. 18 schematically shows elements capable of inputting condition information for the corresponding node in the condition setting layer when the condition input area A120 of the specific node setting layer L100 displayed on the node editing layer of the content generation interface 100 is selected.

As shown in FIG. 18, according to one embodiment of the present invention, the condition information may include one or more of three types. Specifically, the three types may include a basic type ('basic condition' in FIG. 18), a loop type ('loop condition' in FIG. 18), and a general type ('general condition' in FIG. 18).

The basic type corresponds to a type that may assign a basic condition to a node. Specifically, the basic type corresponds to a condition for processing an interaction when the interaction that does not correspond to one or more conditions assigned to the general type is inputted for the corresponding node. For example, the basic type may correspond to the case when the user's face cannot be recognized normally, when the user uses abusive language or profanity as the interaction with respect to the interactive video, and when the user does not react at all within a preset time.

The loop type refers to a type for repeating the node again according to the user's interaction rather than connection from the node to another node corresponding to the next node. Accordingly, when the user's interaction at the node satisfies a condition for the loop type, the interactive video of the corresponding node may be repeated again.

The general type refers to a type capable of assigning a general condition for connection from the node to another node corresponding to the next node. As shown in L121 of FIG. 18, the general type may be set with various types of conditions and branch values corresponding to information connected to other nodes depending on the condition values.

For example, as shown in area A of FIG. 18, various condition values may be set as when the user's face is recognized as male or female (face recognition), when the user's head is recognized as rotating in a specific direction (motion recognition), when the content spoken by the user corresponds to a preset content (voice recognition), when the user performs a selection input, such as a touch, for a specific area of the user terminal 2000 playing the interactive video (area touch), when a specific option is selected among one or more options displayed on the user terminal 2000 (branch selection), when the number of times the user uses the interactive content including the node or the number of times the user is located in the node is more than or equal to the preset number of times (access variable), when a time zone in which the user is located in the node corresponds to a preset time zone (time variable), and when the time taken for the user's interaction is within or exceeds a preset time (response time).

Meanwhile, the user may set one or more condition values among the above conditions. When the condition values are set, a relationship (such as AND and OR) between the condition values may be set as shown in L121 of FIG. 18.

In addition, as shown in L121 of FIG. 18, only the name of the other node ('node2' in FIG. 18) corresponding to the next node may be inputted when the branch values are set. However, the user may additionally assign the time required for transition to the other node, and accordingly, various effects may be assigned to the transit from the specific node to the other node within the interactive content.

In addition, when the user performs an interaction satisfying a corresponding condition upon setting the general type of condition information as shown in L121 of FIG. 18, a factor, such as a good impression, capable of increasing or decreasing a score for evaluating a user by a preset value may be additionally set. When the user performs interactions from the first node to the last node of the interactive content through the above factor, the user's score may be accumulated via each node, and the finally accumulated user's score may be provided, or a separate service corresponding to the finally accumulated user's score may be provided to the user.

As described in FIGS. 16 to 18, in the related art to generate the interactive content of the present invention, it is very inconvenient to generate the interactive content when the user does not have a video source or coding knowledge usable for the interactive content even when the user has an idea or planning ability for an interactive content.

However, according to the present invention, even when the user does not have the video source, the user may just input text information through one or more interactive objects provided by the service server 1000, and accordingly, the service server 1000 may automatically generate the interactive video in which the interactive object utters the text information, and the user may assign a plurality of nodes to be included in the interactive content and a connection relationship between the nodes, through the content generation interface 100 provided by the service server 1000, so that the user can intuitively generate the interactive content.

Figures 19A, 19B:
FIGS. 19A and 19B schematically show emotion meta information and an interactive video to which the emotion meta information is applied according to one embodiment of the present invention.

FIGS. 19A and 19B schematically show emotion meta information and an interactive video to which the emotion meta information is applied according to one embodiment of the present invention.

As shown in FIGS. 19A and 19B, the node generation information received in the content generation interface providing step S100 and S110 may further include emotion meta information assigned to each of one or more utterance units included in the text information, and the interactive video generated in the node generation step S120 may include one or more non-verbal elements corresponding to the emotional meta information assigned to the utterance units when the interactive object utters the one or more utterance units.

Specifically, as shown in FIG. 17A, the emotional meta information may be further included in the node generation information. The emotional meta information may correspond to information on a specific emotion assigned to each of one or more speech units among a plurality of speech units included in the text information. For example, as shown in FIG. 19A, text information may include a plurality of utterance units such as "Hello?" and "Why did you lie! !" B, and '<Anger>' C assigned to the utterance unit corresponding to "Why did you lie! !" B may be the emotion meta information. Meanwhile, as shown in FIG. 19A, the type of emotion meta information may include various emotions such as 'joy', 'sadness', 'pleasure' as well as 'anger'.

According to one embodiment of the present invention, as shown in FIG. 17A, text information and emotion meta information are shown as independent information. However, in another embodiment of the present invention, the emotion meta information may be integrated into the text information.

Meanwhile, in the node generation step S120, the interactive video may be generated based on the object selection information, text information, and emotion meta information for the specific interactive object included in the node generation information. When the interactive object in the interactive video utters an utterance unit to which emotion meta information is assigned, the interactive object may use one or more non-verbal elements according to the assigned emotion meta information.

For example, as shown in FIG. 19B, in a section in which the interactive object of the interactive video utters the utterance unit "Why did you lie! !" B to which emotional meta information '<Anger>' C is assigned, the interactive object may use one or more non-verbal elements such as an angry facial expression or an angry gesture (the folded arms gesture in FIG. 19B). It may be understood that the one or more non-verbal elements include semi-verbal elements such as intonation, tone, strength, and pitch of a voice in addition to facial expressions and actions, and visual elements such as colors or components of a background.

Figure 20:
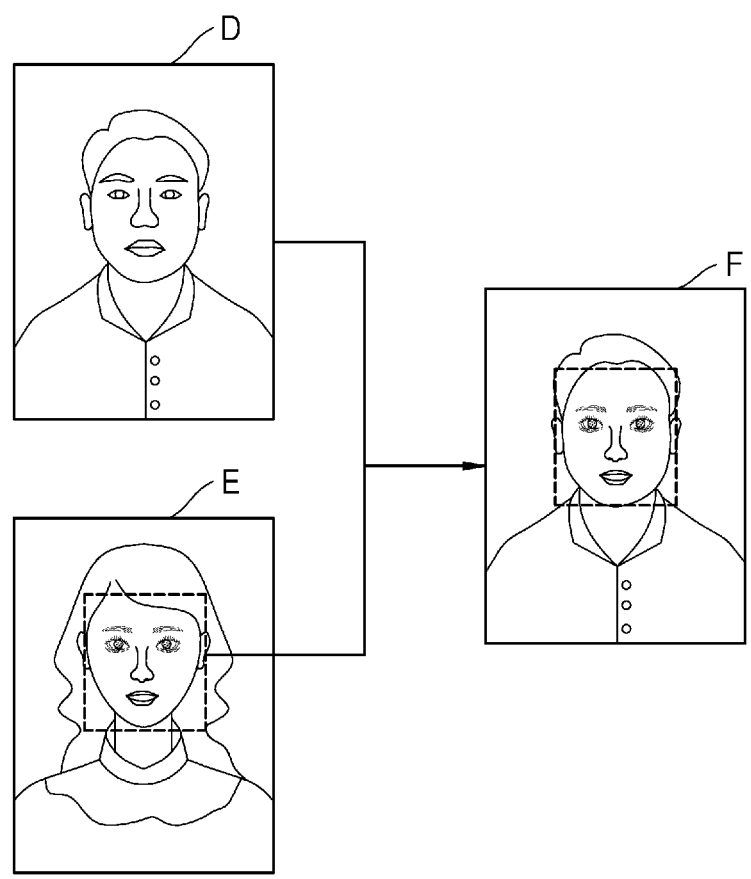
FIG. 20 schematically shows an interactive video to which a face image received from the user terminal is applied in a specific interactive object according to one embodiment of the present invention.

FIG. 20 schematically shows an interactive video applied thereto with a face image received from the user terminal 2000 in a specific interactive object according to one embodiment of the present invention.

As shown in FIG. 20, in the node generation step S120, when a face image is additionally received on the content generation interface 100 from the user of the user terminal 2000 in the content generation interface providing step S100 and S110, a face of the selected specific interactive object may be replaced with the face image, and an interactive video in which the interactive object replaced with the face image utters text information may be generated.

Specifically, the user may use the interactive object stored in the service server 1000 as it is, and may change and use the face of the interactive object into an arbitrary face image E.

More specifically, in the content generation interface providing step S100 and S110, the user may input object selection information for a specific interactive object D to be used through the user terminal 2000, and additionally upload the face image E to change the face of the specific interactive object D.

Meanwhile, in the node generation step S120, only the facial area may be separated from the received face image E to generate the interactive video included in the node, and the separated facial area may be synthesized with the facial area of the selected specific interactive object D, so that the interactive video may be generated in which an interactive object F replaced with the face image utters text information.

According to the present invention, various methods known in the related art may be used to generate the interactive object replaced with the face image. For example, in the node generation step S120, artificial intelligence-based image synthesis technology, such as deep fakes, may be used, so that the interactive video may be generated in which the interactive object replaced with the face image utters text information.

According to the above configuration, even when the user has no video source to use as interactive content, the user may generate the video by using the interactive object stored in the service server 1000. It is not limited to the interactive object stored in the service server 1000, and the face of the interactive object may be replaced by the face image uploaded by the user, so that the user can customize the interactive object, and accordingly, the fun and interest in the interactive content can be further increased.

Figure 21:
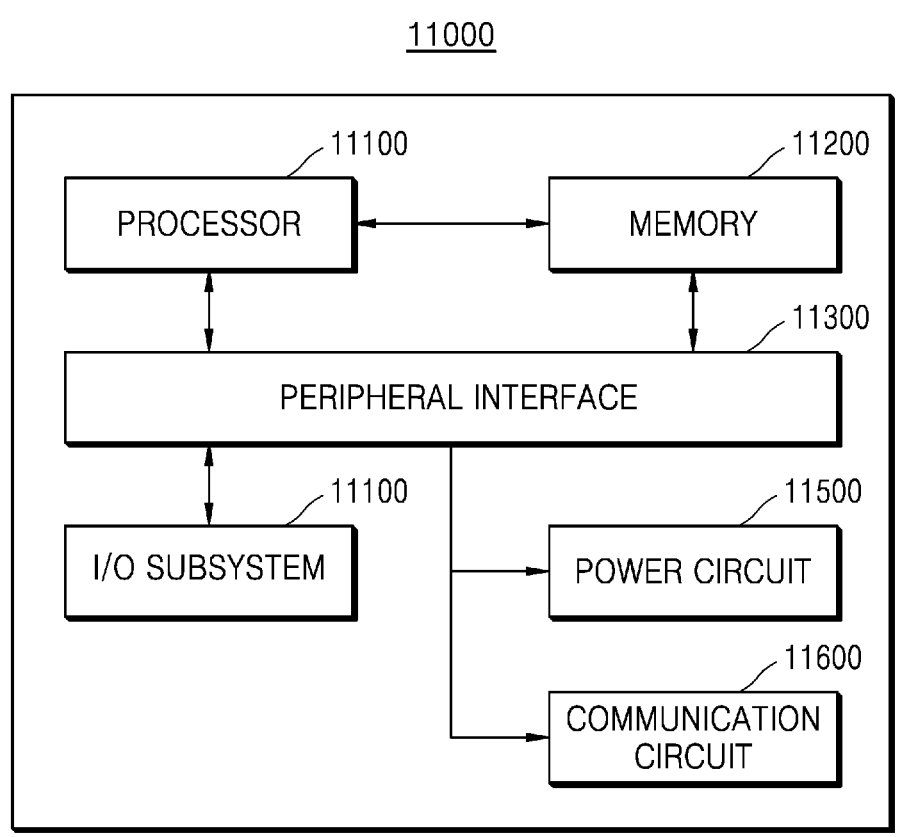
FIG. 21 schematically shows internal components of the computing device according to one embodiment of the present invention.

FIG. 21 schematically shows internal components of the computing device according to one embodiment of the present invention.

The sever system 1000 shown in the above-described FIG. 1 and the service server 1000 shown in the above-described FIG. 13 may include components of the computing device 11000 shown in FIG. 21.

As shown in FIG. 21, the computing device 11000 may at least include at least one processor 11100, a memory 11200, a peripheral device interface 11300, an input/output subsystem (I/O subsystem) 11400, a power circuit 11500, and a communication circuit 11600. The computing device 11000 may correspond to the computing device 1000 shown in FIG. 1.

The memory 11200 may include, for example, a high-speed random access memory, a magnetic disk, an SRAM, a DRAM, a ROM, a flash memory, or a non-volatile memory. The memory 11200 may include a software module, an instruction set, or other various data necessary for the operation of the computing device 11000.

The access to the memory 11200 from other components of the processor 11100 or the peripheral interface 11300, may be controlled by the processor 11100.

The peripheral interface 11300 may combine an input and/or output peripheral device of the computing device 11000 to the processor 11100 and the memory 11200. The processor 11100 may execute the software module or the instruction set stored in memory 11200, thereby performing various functions for the computing device 11000 and processing data.

The input/output subsystem may combine various input/output peripheral devices to the peripheral interface 11300. For example, the input/output subsystem may include a controller for combining the peripheral device such as monitor, keyboard, mouse, printer, or a touch screen or sensor, if needed, to the peripheral interface 11300. According to another aspect, the input/output peripheral devices may be combined to the peripheral interface 11300 without passing through the I/O subsystem.

The power circuit 11500 may provide power to all or a portion of the components of the terminal. For example, the power circuit 11500 may include a power failure detection circuit, a power converter or inverter, a power status indicator, a power failure detection circuit, a power converter or inverter, a power status indicator, or any other components for generating, managing, and distributing the power.

The communication circuit 11600 may use at least one external port, thereby enabling communication with other computing devices.

Alternatively, as described above, if necessary, the communication circuit 11600 may transmit and receive an RF signal, also known as an electromagnetic signal, including RF circuitry, thereby enabling communication with other computing devices.

The above embodiment of FIG. 21 is merely an example of the computing device 11000, and the computing device 11000 may have a configuration or arrangement in which some components shown in FIG. 21 are omitted, additional components not shown in FIG. 21 are further provided, or at least two components are combined. For example, a computing device for a communication terminal in a mobile environment may further include a touch screen, a sensor or the like in addition to the components shown in FIG. 21, and the communication circuit 11600 may include a circuit for RF communication of various communication schemes (such as WiFi, 3G, LTE, Bluetooth, NFC, and Zigbee). The components that may be included in the computing device 11000 may be implemented by hardware, software, or a combination of both hardware and software which include at least one integrated circuit specialized in a signal processing or an application.

The methods according to the embodiments of the present invention may be implemented in the form of program instructions to be executed through various computing devices, thereby being recorded in a computer-readable medium. In particular, a program according to an embodiment of the present invention may be configured as a PC-based program or an application dedicated to a mobile terminal. The application to which the present invention is applied may be installed in the computing device 11000 through a file provided by a file distribution system. For example, a file distribution system may include a file transmission unit (not shown) that transmits the file according to the request of the computing device 11000.

The above-mentioned device may be implemented by hardware components, software components, and/or a combination of hardware components and software components. For example, the devices and components described in the embodiments may be implemented by using at least one general purpose computer or special purpose computer, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and at least one software application executed on the operating system. In addition, the processing device may access, store, manipulate, process, and create data in response to the execution of the software. For the further understanding, some cases may have described that one processing device is used, however, it is well known by those skilled in the art that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, a code, and an instruction, or a combination of at least one thereof, and may configure the processing device to operate as desired, or may instruct the processing device independently or collectively. In order to be interpreted by the processor or to provide instructions or data to the processor, the software and/or data may be permanently or temporarily embodied in any type of machine, component, physical device, virtual equipment, computer storage medium or device, or in a signal wave to be transmitted. The software may be distributed over computing devices connected to networks, so as to be stored or executed in a distributed manner. The software and data may be stored in at least one computer-readable recording medium.

The method according to the embodiment may be implemented in the form of program instructions to be executed through various computing mechanisms, thereby being recorded in a computer-readable medium. The computer-readable medium may include program instructions, data files, data structures, and the like, independently or in combination thereof. The program instructions recorded on the medium may be specially designed and configured for the embodiment, or may be known to those skilled in the art of computer software so as to be used. An example of the computer-readable medium includes a magnetic medium such as a hard disk, a floppy disk and a magnetic tape, an optical medium such as a CD-ROM and a DVD, a magneto-optical medium such as a floptical disk, and a hardware device specially configured to store and execute a program instruction such as ROM, RAM, and flash memory. An example of the program instruction includes a high-level language code to be executed by a computer using an interpreter or the like as well as a machine code generated by a compiler. The above hardware device may be configured to operate as at least one software module to perform the operations of the embodiments, and vise versa.

According to one embodiment of the present invention, the work is segmented into a plurality of zones, and the zones segmented on the work are assigned a plurality of workers to allow the workers to perform tasks for one work, so that the task can be rapidly performed.

According to one embodiment of the present invention, a task may be performed on an object having a part included in a specific zone and a remainder deviating from the specific zone based on a boundary rule, so that the worker performing task on a specific zone of the work can be prevented from missing a task on an object located over a plurality of boundaries of the work.

According to one embodiment of the present invention, a content generation interface to a user terminal may be provided, and a user who uses the user terminal may generate an interactive content by inputting node generation information for each of a plurality of nodes included in the interactive content to be generated on the content generation interface, so that even a user without professional knowledge can easily generate an interactive content.

According to one embodiment of the present invention, the user in the content generation interface may input object selection information and text information for a specific interactive object stored in the service server, and accordingly, the service server may generate an interactive video in which the specific interactive object utters the text information, so that the user can generate an interactive content without producing a separate video.

According to one embodiment of the present invention, the user may input node connection information using various non-verbal elements, such as voice recognition, face recognition, and motion recognition, as condition values through the content generation interface, and accordingly, various types of interactions of a user using an interactive content produced by the inputting user may be recognized, so that users' interest in the interactive content can be increased.

According to one embodiment of the present invention, when the user selects a video confirmation element included in the node setting layer, the interaction video may be generated according to the node generation information inputted by the user and may be provided through the playback layer, so that the user can check a result according to the node generation information inputted by the user in advance.

According to one embodiment of the present invention, when a face image is additionally received from the user terminal in the node generation step, the user may apply the face image to a specific interactive object selected by the user, and the interactive video in which the specific interactive object utters the text information may be generated, so that the interactive video can be easily generated using only an image.

According to one embodiment of the present invention, the node generation information may further include emotion meta information, the interactive video generated according to the node generation information, when one or more utterance units included in text information are uttered according to the emotion meta information, may utter the one or more utterance units by using one or more non-verbal elements corresponding to the emotion meta information, so that an interactive video added with one or more non-verbal elements can be generated.

Although the above embodiments have been described with reference to the limited embodiments and drawings, however, it will be understood by those skilled in the art that various changes and modifications may be made from the above-mentioned description. For example, even though the described descriptions may be performed in an order different from the described manner, and/or the described components such as system, structure, device, and circuit may be coupled or combined in a form different from the described manner, or replaced or substituted by other components or equivalents, appropriate results may be achieved.

Therefore, other implementations, other embodiments, and equivalents to the claims are also within the scope of the following claims.

What is claimed is:

1. A method for generating an interactive content performed in a service server communicating with one or more user terminals and including one or more processors and one or more memories, in which one or more interactive objects are stored in the service server, the method comprising:
a content generation interface providing step of providing a content generation interface to a user terminal, and receiving node generation information, on the content generation interface from a user of the user terminal, that includes object selection information including selection of a specific interactive object among the one or more interactive objects for each of one or more nodes and text information, and further includes condition information for proceeding from the node to one or more other nodes according to an input of the user; and
a node generating step, based on the node generation information, of generating a node including node connection information connected to one or more other nodes corresponding to a next node, according to an interactive video in which the specific interactive object utters corresponding text information and corresponding condition information or preset basic condition information when the corresponding condition information is not inputted,
wherein the interactive content includes a plurality of nodes, and each node is connected to one or more other nodes by corresponding node connection information, and
wherein the node connection information includes:
one or more condition values for each of one or more interactions in which the user responds to a corresponding node; and
branch values for one or more other nodes transited within the interactive content when the one or more condition values are satisfied.

2. A method for generating an interactive content performed in a service server communicating with one or more user terminals and including one or more processors and one or more memories, in which one or more interactive objects are stored in the service server, the method comprising:
a content generation interface providing step of providing a content generation interface to a user terminal, and receiving node generation information, on the content generation interface from a user of the user terminal, that includes object selection information including selection of a specific interactive object among the one or more interactive objects for each of one or more nodes and text information, and further includes condition information for proceeding from the node to one or more other nodes according to an input of the user; and
a node generating step, based on the node generation information, of generating a node including node connection information connected to one or more other nodes corresponding to a next node, according to an interactive video in which the specific interactive object utters corresponding text information and corresponding condition information or preset basic condition information when the corresponding condition information is not inputted,
wherein the interactive content includes a plurality of nodes, and each node is connected to one or more other nodes by corresponding node connection information, and
wherein the content generation interface displays one or more node setting layers that receive node generation information for each of one or more nodes according to an input of the user, and
the node setting layer includes a video confirmation element for displaying a playback layer that generates and plays the interactive video in which a specific interactive object included in the node generation information utters text information included in the node generation information, according to a selection input of the user.

3. A method for generating an interactive content performed in a service server communicating with one or more user terminals and including one or more processors and one or more memories, in which one or more interactive objects are stored in the service server, the method comprising:
a content generation interface providing step of providing a content generation interface to a user terminal, and receiving node generation information, on the content generation interface from a user of the user terminal, that includes object selection information including selection of a specific interactive object among the one or more interactive objects for each of one or more nodes and text information, and further includes condition information for proceeding from the node to one or more other nodes according to an input of the user; and a node generating step, based on the node generation information, of generating a node including node connection information connected to one or more other nodes corresponding to a next node, according to an interactive video in which the specific interactive object utters corresponding text information and corresponding condition information or preset basic condition information when the corresponding condition information is not inputted, wherein the interactive content includes a plurality of nodes, and each node is connected to one or more other nodes by corresponding node connection information, and wherein the node generation step includes:

replacing, when a face image is additionally received, a face of the selected specific interactive object with the face image on the content generation interface from the user of the user terminal in the content generation interface providing step; and generating an interactive video in which the interactive object replaced with the face image utters text information.

4. A method for generating an interactive content performed in a service server communicating with one or more user terminals and including one or more processors and one or more memories, in which one or more interactive objects are stored in the service server, the method comprising:

a content generation interface providing step of providing a content generation interface to a user terminal, and receiving node generation information, on the content generation interface from a user of the user terminal, that includes object selection information including selection of a specific interactive object among the one or more interactive objects for each of one or more nodes and text information, and further includes condition information for proceeding from the node to one or more other nodes according to an input of the user; and a node generating step, based on the node generation information, of generating a node including node connection information connected to one or more other nodes corresponding to a next node, according to an interactive video in which the specific interactive object utters corresponding text information and corresponding condition information or preset basic condition information when the corresponding condition information is not inputted, wherein the interactive content includes a plurality of nodes, and each node is connected to one or more other nodes by corresponding node connection information, and wherein the node generation information received in the content generation interface providing step further includes emotion meta information assigned to each of one or more utterance units included in the text information, and the interactive video generated in the node generation step includes, when the interactive object utters the one or more utterance units, one or more non-verbal elements corresponding to the emotional meta information assigned to the utterance units.

5. A service server that includes at least one processor and at least one memory, communicates with one or more user terminals to perform a method for generating an interactive content and stores one or more interactive objects therein, the service server comprising:

a content generation interface providing step of providing a content generation interface to a user terminal, and receiving node generation information, on the content generation interface from a user of the user terminal, that includes object selection information including selection of a specific interactive object among the one or more interactive objects for each of one or more nodes and text information, and further includes condition information for proceeding from the node to one or more other nodes according to an input of the user; and a node generating step of, based on the node generation information, generating a node including node connection information connected to one or more other nodes corresponding to a next node, according to an interactive video in which the specific interactive object utters corresponding text information and corresponding condition information or preset basic condition information when the corresponding condition information is not inputted, wherein the interactive content includes a plurality of nodes, and each node is connected to one or more other nodes by corresponding node connection information, and wherein the node connection information includes:

one or more condition values for each of one or more interactions in which the user responds to a corresponding node; and branch values for one or more other nodes transited within the interactive content when the one or more condition values are satisfied.

6. A computer-readable medium for implementing a method for generating an interactive content performed by a service server communicating with one or more user terminals and including at least one processor and at least one memory, in which one or more interactive objects are stored in the service server, the computer-readable medium stores instructions for enabling the service server to perform the following steps, and the method for generating the interactive content comprises:

a content generation interface providing step of providing a content generation interface to a user terminal, and receiving node generation information, on the content generation interface from a user of the user terminal, that includes object selection information including selection of a specific interactive object among the one or more interactive objects for each of one or more nodes and text information, and further includes condition information for proceeding from the node to one or more other nodes according to an input of the user; and a node generating step, based on the node generation information, of generating a node including node connection information connected to one or more other nodes corresponding to a next node, according to an interactive video in which the specific interactive object utters corresponding text information and corresponding condition information or preset basic condition information when the corresponding condition information is not inputted, wherein the interactive content includes a plurality of nodes, and each node is connected to one or more other nodes by corresponding node connection information, and wherein the node connection information includes:

one or more condition values for each of one or more interactions in which the user responds to a corresponding node; and branch values for one or more other nodes transited within the interactive content when the one or more condition values are satisfied.

\* \* \* \* \*